United States Patent
Haynes

(10) Patent No.: US 7,092,953 B1
(45) Date of Patent: Aug. 15, 2006

(54) APPARATUS AND METHODS FOR INTELLECTUAL PROPERTY DATABASE NAVIGATION

(75) Inventor: Ramond M. Haynes, Fullerton, CA (US)

(73) Assignee: Rightlsline, Inc., Beverly Hills, CA (US)

( * ) Notice: Subject to any disclaimer, the term of this patent is extended or adjusted under 35 U.S.C. 154(b) by 540 days.

(21) Appl. No.: 10/036,298

(22) Filed: Dec. 28, 2001

Related U.S. Application Data

(60) Provisional application No. 60/259,194, filed on Dec. 28, 2000.

(51) Int. Cl.
*G06F 17/30* (2006.01)

(52) U.S. Cl. .................... 707/100; 707/102

(58) Field of Classification Search ............. 707/2–6, 707/100, 102–104.1; 705/1, 50
See application file for complete search history.

(56) References Cited

U.S. PATENT DOCUMENTS

| | | | | |
|---|---|---|---|---|
| 5,438,508 | A | 8/1995 | Wyman | 705/1 |
| 5,579,222 | A | 11/1996 | Bains et al. | 705/59 |
| 5,838,910 | A | 11/1998 | Domenikos et al. | 709/203 |
| 5,940,504 | A | 8/1999 | Griswold | 717/167 |
| 6,189,146 | B1 | 2/2001 | Misra et al. | 717/177 |
| 6,236,971 | B1 | 5/2001 | Stefik et al. | 705/8 |
| 6,289,341 | B1 * | 9/2001 | Barney | 707/6 |
| 6,298,327 | B1 * | 10/2001 | Hunter et al. | 705/1 |
| 6,658,568 | B1 * | 12/2003 | Ginter et al. | 713/193 |
| 6,885,999 | B1 * | 4/2005 | Corless | 705/59 |
| 2001/0034846 | A1 * | 10/2001 | Beery | |
| 2002/0040338 | A1 * | 4/2002 | Sick et al. | |
| 2002/0082973 | A1 * | 6/2002 | Marbach et al. | |

FOREIGN PATENT DOCUMENTS

EP    1 045 388 A1    10/2000

OTHER PUBLICATIONS

U.S. Appl. No. 10/035,347, titled "Integrated Media Management and Rights Distribution Apparatus", pending.

* cited by examiner

*Primary Examiner*—Greta Robinson
*Assistant Examiner*—Cheryl Lewis
(74) *Attorney, Agent, or Firm*—Knobbe, Martens, Olson & Bear LLP

(57) ABSTRACT

The present invention advantageously provides a rights management system. In one embodiment, a specification of a general level of rights owned by a first intellectual property rights owner is received. A query is received for a lower level right that is a descendent of at least one of the general level of rights. The system determines if the lower level rights is available for licensing by forming at least a first implicit relationship between the general level of rights owned, and a general level of rights licensed out.

30 Claims, 33 Drawing Sheets

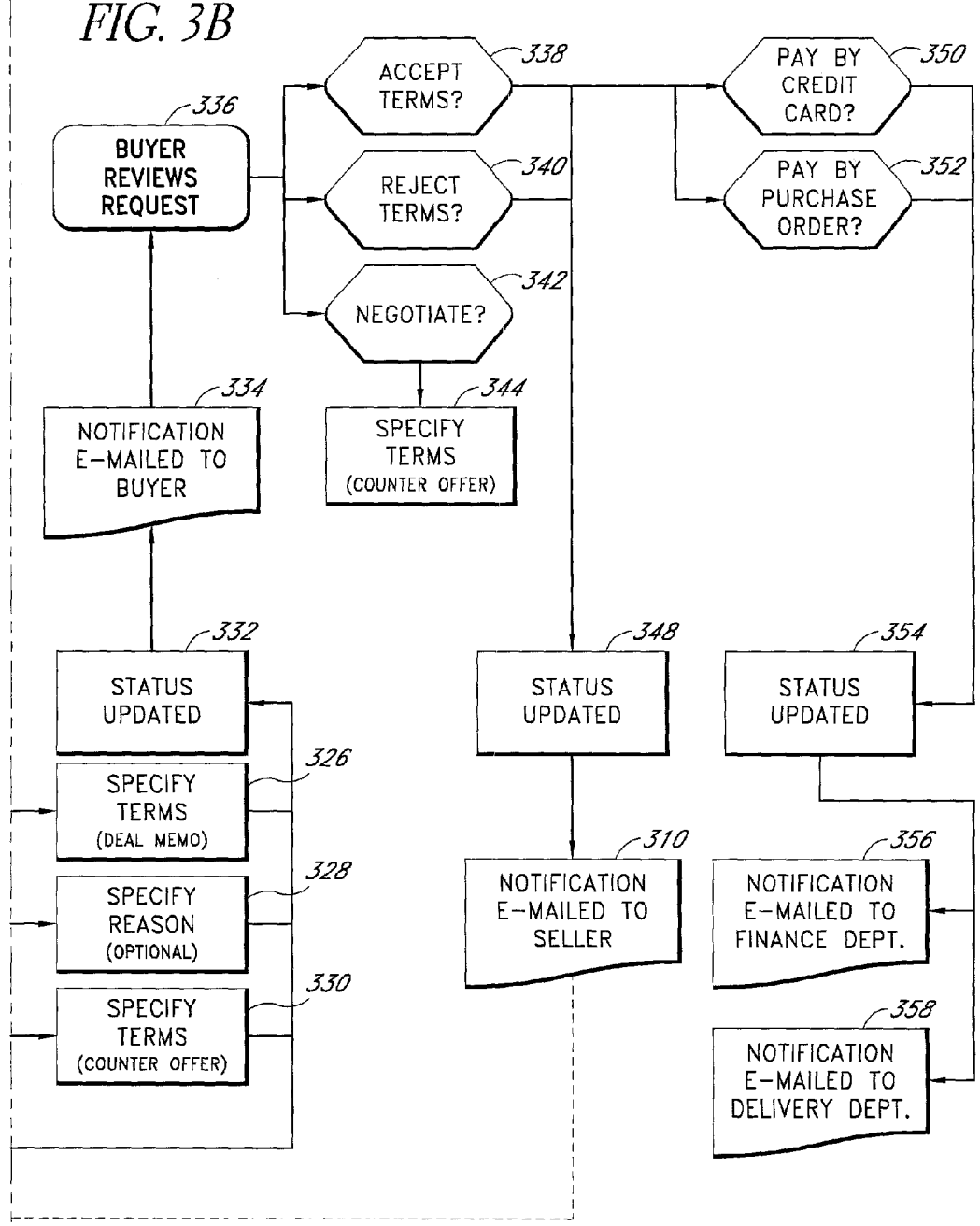

FIG. 5A

List of My Properties — 510

| Property Name | Created On — 520 | No. of Rights — 530 | Edit Delete — 540 | Add |
|---|---|---|---|---|
| Riff-Raff | 8/11/00 3:23:39 pm | 32 | Edit ☐ | Add New Right |
| Beyond the Cubicle | 8/11/00 3:23:39 pm | 28 | Edit ☐ | Add New Right |
| Probe | 8/11/00 3:23:39 pm | 24 | Edit ☐ | Add New Right |
| On the Watch | 8/11/00 3:23:39 pm | 40 | Edit ☐ | Add New Right |
| Wraith | 8/11/00 3:23:39 pm | 32 | Edit ☐ | Add New Right |
| Primordial Game System | 8/11/00 3:23:39 pm | 2 | Edit ☐ | Add New Right |
| John Q. Public | 8/11/00 3:23:39 pm | 2 | Edit ☐ | Add New Right |
| PowerCardz Game System | 8/11/00 3:23:39 pm | 3 | Edit ☐ | Add New Right |
| Survival of the Fittes | 8/11/00 3:23:39 pm | 32 | Edit ☐ | Add New Right |
| Thrill Kill | 8/11/00 3:23:39 pm | 32 | Edit ☐ | Add New Right |

[ Add New Property ] — 550          [ Delete Selected ] — 560

Request Manager

Select template: ▶

Common | Film | Television | Music | Publishing | Merchandising | Interactive | Ancillary | Clips Adaptation Description ☐
Adaptation of work ☐
Grand Right ☐

Media Type ☐
Recording Type ☐
Timing

Usage Type ☐
# of uses ☐
Title

[ Save ]  [ Delete ]  [ Preview ]

| RIGHT_VALUE | RIGHT_PARENT |
|---|---|
| ALL MEDIA | |
| MERCHANDISE | ALL MEDIA |
| MUSIC | ALL MEDIA |
| TELEVISION | ALL MEDIA |
| VIDEO | ALL MEDIA |
| ACCESSORIES | MERCHANDISE |
| APPAREL | MERCHANDISE |
| GAMES | MERCHANDISE |
| PERFORMANCE | MUSIC |
| PULBISHING | MUSIC |
| RECORDING | MUSIC |
| BASIC CABLE | TELEVISION |
| FREE TV | TELEVISION |
| PAY TV | TELEVISION |
| DVD | VIDEO |
| LASER DISC | VIDEO |
| VHS | VIDEO |

*FIG. 9B*

| MEDIA | RIGHT TYPE | RIGHT |
|---|---|---|
| ALL MEDIA | MERCHANDISE | ACCESSORIES |
| ALL MEDIA | MERCHANDISE | APPAREL |
| ALL MEDIA | MERCHANDISE | GAMES |
| ALL MEDIA | MUSIC | PERFORMANCE |
| ALL MEDIA | MUSIC | PULBISHING |
| ALL MEDIA | MUSIC | RECORDING |
| ALL MEDIA | TELEVISION | BASIC CABLE |
| ALL MEDIA | TELEVISION | FREE TV |
| ALL MEDIA | TELEVISION | PAY TV |
| ALL MEDIA | VIDEO | DVD |
| ALL MEDIA | VIDEO | LASER DISC |
| ALL MEDIA | VIDEO | VHS |

*FIG. 9C*

| RIGHT_VALUE (140) | RIGHT_PARENT (150) |
| --- | --- |
| WORLDWIDE | |
| ASIA | WORLDWIDE |
| EUROPE | WORLDWIDE |
| NORTH AMERICA | WORLDWIDE |
| SOUTH AMERICA | WORLDWIDE |
| CHINA | ASIA |
| JAPAN | ASIA |
| KOREA | ASIA |
| FRANCE | EUROPE |
| GERMANY | EUROPE |
| UNITED KINGDOM | EUROPE |
| CANADA | NORTH AMERICA |
| MEXICO | NORTH AMERICA |
| UNITED STATES | NORTH AMERICA |
| ARGENTINA | SOUTH AMERICA |
| BRAZIL | SOUTH AMERICA |
| PERU | SOUTH AMERICA |

*FIG. 10B*

| WORLD (160) | CONTINENT (170) | COUNTRY (180) |
| --- | --- | --- |
| WORLDWIDE | ASIA | CHINA |
| WORLDWIDE | ASIA | JAPAN |
| WORLDWIDE | ASIA | KOREA |
| WORLDWIDE | EUROPE | FRANCE |
| WORLDWIDE | EUROPE | GERMANY |
| WORLDWIDE | EUROPE | UNITED KINGDOM |
| WORLDWIDE | NORTH AMERICA | CANADA |
| WORLDWIDE | NORTH AMERICA | MEXICO |
| WORLDWIDE | NORTH AMERICA | UNITED STATES |
| WORLDWIDE | SOUTH AMERICA | ARGENTINA |
| WORLDWIDE | SOUTH AMERICA | BRAZIL |
| WORLDWIDE | SOUTH AMERICA | PERU |

*FIG. 10C*

| PROPERTY_VALUE (196) | PROPERTY_PARENT (197) |
|---|---|
| ALL PROPERTY | |
| SUMMER BASH 1 | ALL PROPERTY |
| GRINCHO | ALL PROPERTY |
| JAMS | ALL PROPERTY |
| MUMMYO | ALL PROPERTY |
| TERMINATORS | ALL PROPERTY |

*FIG. 11B*

| ALL (198) | PROPERTY (199) |
|---|---|
| ALL PROPERTY | SUMMER BASH 1 |
| ALL PROPERTY | GRINCHO |
| ALL PROPERTY | JAMS |
| ALL PROPERTY | MUMMYO |
| ALL PROPERTY | TERMINATORS |

*FIG. 11C*

| LANGUAGE_VALUE | LANGUAGE_PARENT |
|---|---|
| ALL LANGUAGE | |
| ENGLISH | ALL LANGUAGE |
| FRENCH | ALL LANGUAGE |
| GERMAN | ALL LANGUAGE |
| JAPANESE | ALL LANGUAGE |
| SPANISH | ALL LANGUAGE |

*FIG. 12B*

| ALL | LANGUAGE |
|---|---|
| ALL LANGUAGE | ENGLISH |
| ALL LANGUAGE | FRENCH |
| ALL LANGUAGE | GERMAN |
| ALL LANGUAGE | JAPANESE |
| ALL LANGUAGE | SPANISH |

*FIG. 12C*

| TERM_VALUE | TERM_PARENT |
|---|---|
| 2001 | |
| JAN | 2001 |
| FEB | 2001 |
| MAR | 2001 |
| ... | ... |
| 01-JAN-2001 | JAN |
| 02-JAN-2001 | JAN |
| 03-JAN-2001 | JAN |
| ... | ... |
| 01-FEB-2001 | FEB |
| 02-FEB-2001 | FEB |
| 03-FEB-2001 | FEB |
| ... | ... |
| 01-MAR-2001 | MAR |
| 02-MAR-2001 | MAR |
| 03-MAR-2001 | MAR |
| ... | ... |

*FIG. 13B*

| TERM_YEAR | TERM_MONTH | TERM_DAY |
|---|---|---|
| 2001 | JAN | 01-JAN-2001 |
| 2001 | JAN | 02-JAN-2001 |
| 2001 | JAN | 03-JAN-2001 |
| ... | ... | ... |
| 2001 | FEB | 01-FEB-2001 |
| 2001 | FEB | 02-FEB-2001 |
| 2001 | FEB | 03-FEB-2001 |
| ... | ... | ... |
| 2001 | MAR | 01-MAR-2001 |
| 2001 | MAR | 02-MAR-2001 |
| 2001 | MAR | 03-MAR-2001 |
| ... | ... | ... |

*FIG. 13C*

APPARATUS AND METHODS FOR INTELLECTUAL PROPERTY DATABASE NAVIGATION

PRIORITY CLAIM

This application claims the benefit under 35 U.S.C. 119(e) of U.S. Provisional Application No. 60/259,194, filed Dec. 28, 2000, which is incorporated herein in its entirety.

RELATED APPLICATION

The subject matter of U.S. patent application entitled "Integrated Media Management And Rights Distribution Apparatus," filed on Dec. 28, 2001, Application Ser. No. 10/035,347 is related to this application.

FIELD OF THE INVENTION

The present invention is related to databases, and in particular, to methods and systems for intellectual property database navigation.

BACKGROUND OF THE INVENTION

Intellectual property, embodied in books, articles, films, music, television shows, and the like have become an increasingly important asset. Often, there is a complex bundle of intellectual property rights associated with a given intellectual property asset. For example, an owner of a film can divide and license portions of rights associated with the film. The owner can license the right to exhibit the film in different markets to different licensees. Further, the owner can grant the right to exhibit the film in different language to different licensees. In addition, the licenses can be granted for limited, specified times. Thus, there can be numerous intellectual property rights associated with even a single asset.

In order to manage intellectual property, conventional systems maintain intellectual property databases. Given the number of properties and the large number of associated property rights an owner may have, it can be challenging to determine what properties and rights are available. Using conventional techniques, the process of determining property and rights availability can be time consuming and processor intensive. In addition, the intellectual property database can become very large and difficult to maintain.

SUMMARY OF THE INVENTION

In order to more efficiently determine property and rights status and availability, one embodiment of the present invention optionally determines the availability of intellectual property rights through a bi-directional hierarchical navigation process and by extracting implied data relations.

In one embodiment, the repository may perform data management by inference rather than by direct reference. In this embodiment, the intellectual property rights owner specifies only the most or more general level of rights owned, and the most or more general level of rights licensed out. When a query for specific rights is made, i.e., "descendents" of the general right, the central repository determines if those rights are still available by forming implicit relationships between the most or more general level of rights owned, and the most or more general level of rights licensed out. This novel process provides a faster, more efficient technique to determine the availability of intellectual property rights than that provided by conventional intellectual property rights management systems.

The present invention therefore, advantageously provides an intellectual property rights management and licensing system that enables the efficient storage and extraction of intellectual property rights-related information.

BRIEF DESCRIPTION OF THE DRAWINGS

These features will now be described with reference to the drawings summarized below. These drawings and the associated description are provided to illustrate a preferred embodiment of the invention, and not to limit the scope of the invention.

FIGS. 3A and 3B illustrate an example transaction process for licensing intellectual property rights.

FIGS. 5A–K illustrates a sample page containing a list of an owner's properties and user interfaces for specifying rights for a property.

FIGS. 7A and 7B illustrate an example request template.

FIGS. 9A, 9B, and 9C illustrate hierarchy trees, hierarchy tables, and circular view tables for right types.

FIGS. 10A, 10B, and 10C illustrate hierarchy trees, hierarchy tables, and circular view tables for geographical territories.

FIGS. 11A, 11B, and 11C illustrate hierarchy trees, hierarchy tables, and circular view tables for properties.

FIGS. 12A, 12B, and 12C illustrate hierarchy trees, hierarchy tables, and circular view tables for languages.

FIGS. 13A, 13B, and 13C illustrate hierarchy trees, hierarchy tables, and circular view tables for term dates.

DETAILED DESCRIPTION OF PREFERRED EMBODIMENTS

Figure 1:
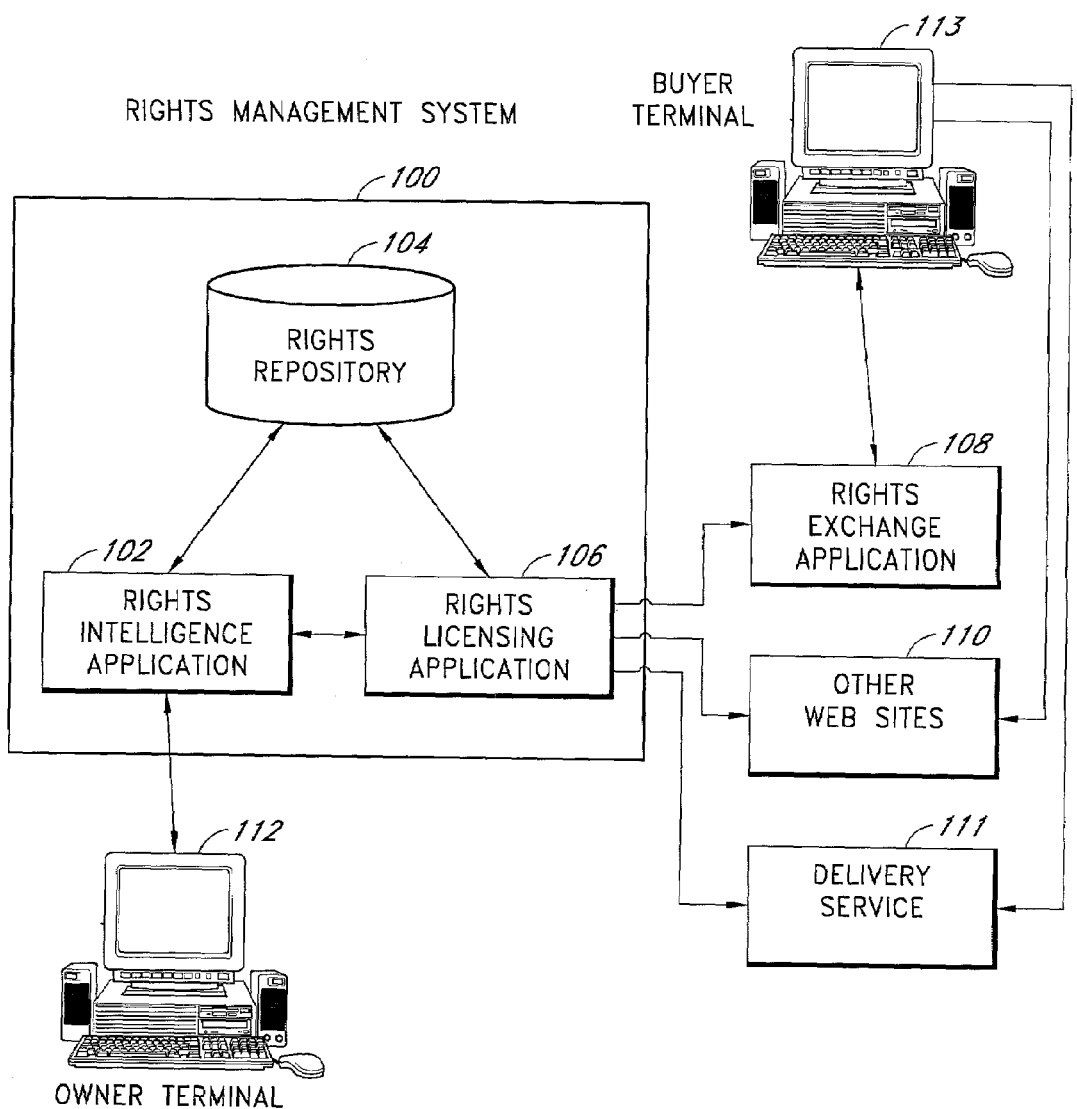
FIG. 1 illustrates an example embodiment of the rights management and licensing system.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In the figures, words and phrases are underlined to indicate a hyperlink to a document or Web page related to the underlined word or phrase. In addition, unless otherwise indicated, the functions described herein are preferably performed by executable code running on one or more general purpose or computers or on servers.

A novel information rights management and licensing system, described in greater detail below, provides users with an integrated rights management and licensing system for storing, researching, tracking, licensing, buying, and selling intellectual property rights. The rights-centric rights management and licensing system aggregates rights information into a repository, and makes the information quickly and widely accessible. Rights owners can thereby optionally manage their intellectual property rights locally, while distributing them globally. In addition, the rights management and licensing workflow is configurable by rights owners using the integrated rights management and licensing system. Thus, rather being constrained to a predefined, unsuitable workflow for managing and licensing their rights, the present invention allows the work flow to be freely reconfigured or changes as desired. Changes are implemented in real time, so that the next time a licensee begins the licensing process for a right owned by the rights owner, the changes will be reflected in the licensing workflow.

Thus, the present invention provides rights owners and licensors the ability to efficiently produce revenue for intellectual property related to media, such as movies, television shows, music, books, computer games, trademarks, personality, and so on.

Often there is a complex set of rights and rights owners associated with a given type of media property. For example, studios, agents, producers and actors may selectively own rights for film distribution, productions, consumer products, development, advertising, merchandising, clips and stills. With respect to music, record labels, publishing companies and artists may selectively own production, advertising, sync, and/or licensing and merchandising rights. The media can also include documents, such as scripts, x-rays, novels, and the like. A system in accordance with the present invention, effectively manages these ownership rights, and allows these rights to be effectively exploited.

As illustrated in FIG. 1, in one embodiment, a rights management and licensing system 100 in accordance with the present invention includes four main components the enable the management and licensing of intellectual property to be performed in a real time, seamless manner: a rights intelligence application 102, also termed a rights owner application, a central rights repository 104, a rights licensing application 106 and a rights exchange application 108. External systems, such as other web sites 110 or delivery services 111, can access or provide links to the rights management and licensing system 100 via the rights licensing application 106.

The rights owner application 102 optionally executes on a server associated with the rights owner, or the application 102 can instead execute on a server operated by an on-line rights management and licensing service provider. In other embodiments, the rights management and licensing system 100 can be hosted on a single server as a single application.

An owner, seller or licensor manages and tracks the transaction and the status of various property rights using the rights owner or intelligence application 102 via the owner's terminal 112, while the buyer uses the rights exchange application. The term licensor, as used herein, can include the owner, or an agent of the licensor or owner. A buyer using a terminal 113, which can be, by way of example, a personal computer, a personal digital assistant, an interactive television, a networked appliance, or the like, can access the rights management and licensing system 100 via the rights exchange application 108 or through other web sites 110, which may employ third-party software or that may provide access to the rights exchange application 108. The term buyer, as used herein, can also include a licensor or an agent of the buyer or licensor.

In one embodiment, the rights owner application 102 resides in a presentation layer, the licensing application 106 resides in an application layer, and the central repository 104 resides in a data layer. The central rights repository 104, the rights licensing application 106 and the rights exchange application 108 can be executed on one or more servers managed by the on-line rights management service provider. In one embodiment, these components may be used in conjunction with each other to integrate the management and licensing of intellectual property by enabling intellectual property owners and consumers to conduct real-time licensing transactions over a network, such as a public internet, private intranet, and so on.

The rights owner application 102 enables rights owners, including rights licensors or sellers, to collect, manage, and analyze their intellectual property and associated rights. In particular, property rights owners can track two basic sets of information, including the rights they have acquired (Rights In), and the rights they have sold or licensed to another entity (Rights Out). Using the rights owner application 102, the rights owner can specify, view and update detailed information relating to their intellectual property. The rights owner application 102 captures descriptive information about the intellectual property, rights owned, rights that have been licensed out, pricing rules, workflow rules, payment processing, license request forms, license agreements, application security, data access, reporting, analysis and the like. The licensors can also view and edit their license agreements, license request forms, payment information, and privacy information. The licensors can also determine and specify the level of access to their intellectual property that the rights management and licensing system can provide to existing or potential licensees, and other clients. The rights owner application 102 enables the rights owner to conduct licensing transactions on-line, via the Internet or other network, thereby giving broad exposure of the owned rights to potential purchasers and licensees.

Some or all of the information provided by the licensor using the rights owner application 102 may be stored in the central rights repository database 104 which may be located on one or more servers associated with the rights management and licensing system 100. Information can be extracted from other applications, such as financial management systems or legacy intellectual property management systems and stored in the central repository 104. The data extraction and storage process can be configured by the user to occur offline in batch mode by importing data from a file generated by the licensor or to occur in real time as the licensor enters or edits information in a rights management application, such as a legacy database.

The central repository 104 may also store all or part of the actual intellectual property in the form of if digitized in the form of digital audio, video, text files, or the like, thereby enabling prospective licensees and consumers to view or listen to the intellectual property. Alternatively or in addition, the central repository 104 optionally stores pointers or links to another site, such as the licensor's site, which hosts the actual intellectual property. In one embodiment, the central repository 104 provides a common location for data storage for intellectual property owners, intellectual property consumers, and any third party intermediaries that may be involved in a licensing transaction.

The rights licensing application 106 enables other systems or applications, such as the rights exchange application 108, to access the central rights repository 104. For example, the rights licensing application 106 can contain business logic and rules that should be adhered to by systems that interact with the central rights depository 104. In another embodiment, the business logic and rules reside on a client system, such as the owner's terminal 112.

In one embodiment, the rights licensing application 106 can be placed in a "wait and listen" state, listening for information requests. The rights licensing application 106 can interpret these requests and make the appropriate calls to the central rights repository 104 to display, insert, update, or delete data accordingly. In addition, the rights licensing application 106 returns corresponding data to the calling application. In addition, as changes in the status of intellectual property rights are made, for example, as rights are sold and/or no longer available, the licensing application 106 sends real-time instructions to the central rights repository 104 to change the status of the rights. Such changes are then also reflected to the licensor the next time the licensor views the status of intellectual property rights owned.

Using the capabilities of the rights owner application 102, the central repository database 104, and the rights licensing application 106, the rights exchange application 108 enables rights owners and purchaser or licensees to conduct a licensing transaction of intellectual property. The licensing transaction process may include searching for specific types of intellectual properties or rights, submission of a license request to the appropriate licensor, negotiation of terms, acceptance of a license agreement, payment of the transaction, and facilitation of the delivery of the intellectual property, whether physical or digital in nature.

Figure 2:
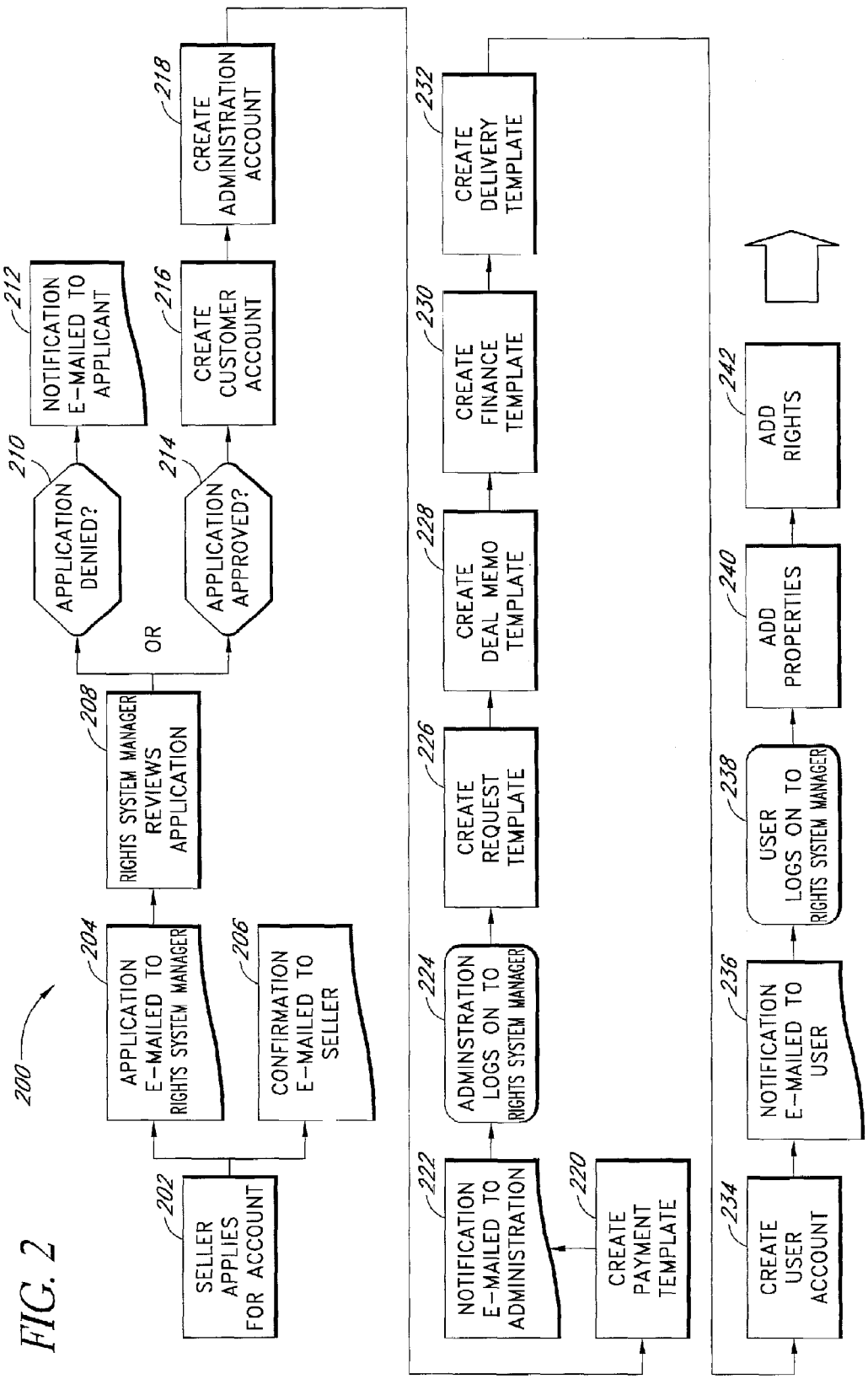
FIG. 2 illustrates an example process used to establish an account for an intellectual property owner and for providing information related to the selling or licensing of intellectual property rights.

FIG. 2 illustrates an example process 200 used to establish an account for an intellectual property owner and for providing information related to the selling or licensing of intellectual property rights. In the example embodiment, the process 200 is substantially performed by the rights owner application 102. The data obtained via process 200 may be stored in records in the rights repository 104 on a central rights repository server or on another server. At state 202, an intellectual property owner or seller desirous of selling or licensing rights applies for an account, providing relevant information, such as name, contact information, industry, line of business, and the like. The owner or the seller may also be required to specify a user name and password, or the user name and password may be provided by the right management system 100. The term "seller," as used herein, also includes a licensor or intellectual property rights. Similarly, the term "buyer," as used herein, also refers to a licensee.

The account application is sent, via e-mail 204 or the like, to the administrator of the rights owner application 102, which may be an employee of the rights owner or of the rights management service provider. The user name or ID and the password will then be associated with the owner's/seller's account. A confirmation e-mail 206 is sent to the applicant notifying the applicant that the application has been received.

At state 208, the rights management service provider reviews the seller's application. The review ensures that the applicant has provided all necessary information asked for in the application. The review optionally also includes a background check of the applicant and a check to make sure that a duplicate account is not being created. If the application is denied at state 210, a notification of the denial is sent to the seller applicant at state 212. If the application is accepted at state 214, a customer account is created at state 216. An administrative account is created at state 218. This account may include the information provided by the applicant such as customer name, contact information, type of industry, line of business, and department name. The account may also include information generated by the rights management and licensing system 100, such as a system-generated identifier.

A payment template for any future payments that may be made to the seller's account by licensees is created at state 220. A notification 222 is then sent to the seller's administrator after the account has been set up and the payment template has been created. The owner or the owner's administrator logs on at state 224 to the rights management and licensing system and proceeds to set up templates and the like for the owner's account. In particular, the owner creates several templates used to order to gather and distribute consistent data related to the intellectual property rights that the owner wants to license or sell.

Figure 7A:
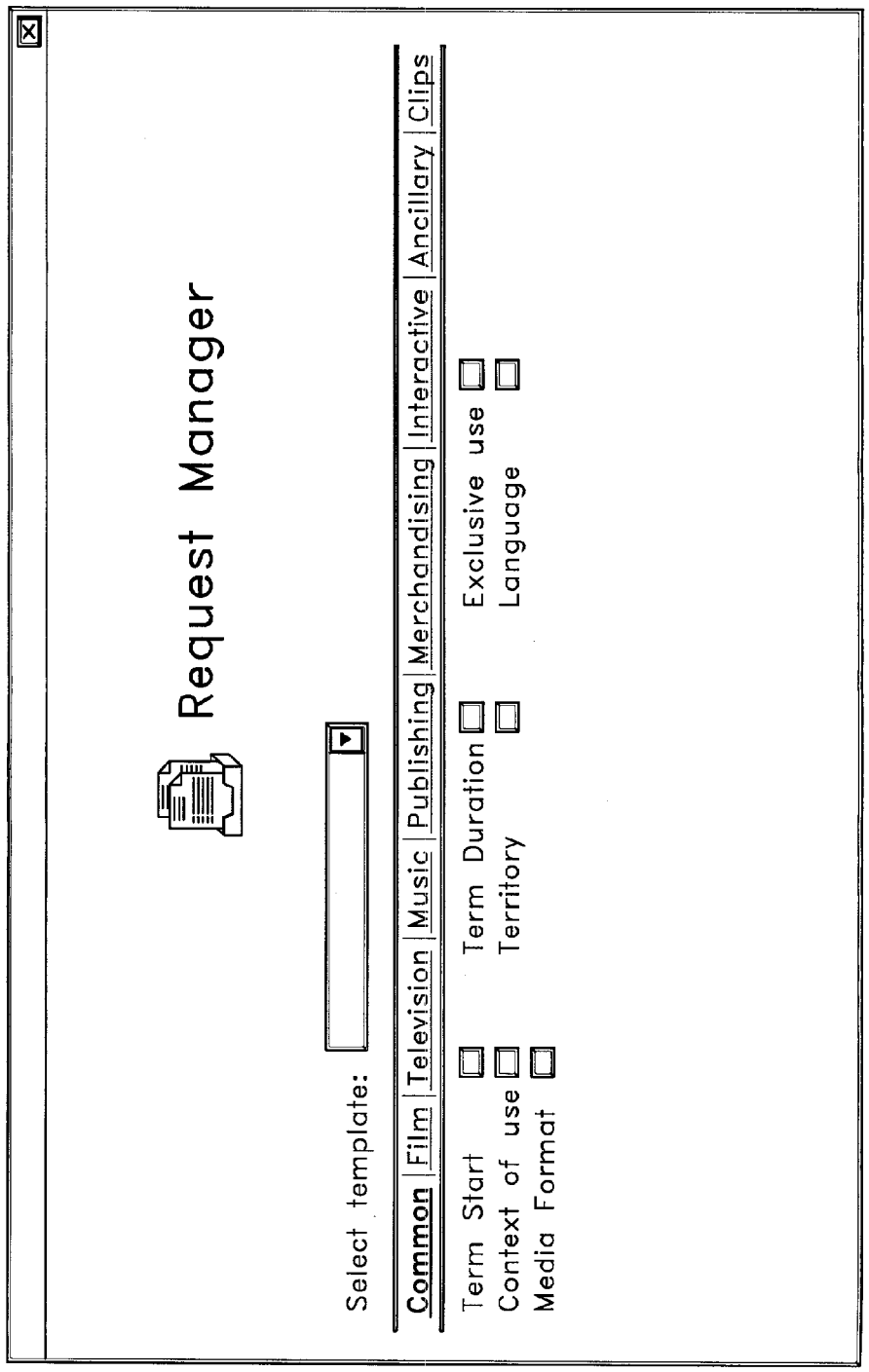

At state 226, the owner's or the seller's administrator creates or customized a license request template in accordance with the owner's needs or requirements. The request template is used to gather consistent data from each potential buyer or licensee requesting to purchase or license rights for a property. Since the information is provided in a consistent manner, the seller can more efficiently analyze each request and make an informed decision in deciding when and how to license the property rights. The following is an exemplary list of request template fields:

Name
Company
E-mail
Address
Phone
Fax
Department
Property
Right (including term, territory, media and language)
Use of Right A sample request template is illustrated in FIGS. 7A–B. FIG. 7A illustrates some of the parameters that the seller may choose to include in a template common to all media types. These may include fields such as term start, term duration, media format, territory, and the like. The seller may select which fields are to be included in request templates for all media and then further specify fields for specific media types. FIG. 7B illustrates an example of the parameters that the seller may choose to include in a template specifically for intended music properties. Options that the seller may choose to include in the music request template may include timing, media type, recording type, usage type, number of uses allowed, and so on. The seller can later edit these request templates, by adding and/or deleting fields.

At state 228, a license agreement, also called a deal memo, template is created. The license agreement template allows the seller to create a standard format for deals involving a particular type of property. The rights owner application may populate the license agreement template with selected initial information, including, as a default, information from the request template. The license agreement template may then be provided in response to buyer or licensee requests. The seller can modify the license agreement template terms for a specific transaction or deal.

At state 230, the seller can generate a finance template, which may be used as follows. Once an agreement is reached between the seller and a buyer, and the license agreement has been agreed to and/or executed, a finance memo including finance terms, is generated based on the finance template. Example fields and data are as follows:

| | |
|---|---|
| Total Payment ($) | $25,000 |
| Number of Payments: | 4 |
| Due Dates: | $7,000 due upon execution of Deal |
| | $7,000 due 30 days after delivery |
| | $6,000 due 60 days following delivery |
| | $5,000 due 120 days following delivery |

To assure consistent and accurate information flow, a delivery template is created at state 232, with the appropriate information fields. Example fields and data are as follows:

| | |
|---|---|
| Property: | "Summer Bash I" |
| Territory: | US and Canada |
| Language: | English |
| Dubbing: | N |
| Format: | VHS Beta Dub |
| Master: | N |
| Additional: | Press Kit, One Sheet |

For a customer having several employees or users who are to utilize the rights management and licensing system 100, prior to a user accessing the system, the customer administrator, at state 234 creates a unique user account for each person identified as a user. The user account information can include one or more of the following information:
  Last Name
  First Name
  Email Address
  Language Preference
  Company Name
  User Group Optionally, the language preference, company name, and user group can be selected from corresponding drop-down lists. This ensures that the administrator is limited to selecting valid or available language preferences, company names, and user groups.

A user group may be defined according to the user's job responsibilities. For example, there may be a "pricing staff" group responsible for rights pricing, a "request reviewer" group that receives, reviews, and approves or disapproves of requests from buyers or licensees. Different groups can be accorded with different editing, creation and security rights with respect to viewing and/or editing information relating to properties. Thus, for example, the ability to change pricing or financing information may be restricted to users who are defined as members of the pricing staff group. Similarly, the ability to accept or reject an offer may be restricted to users who are defined as members of the request reviewer group. Thus, by assigning a new user to an appropriate group, the administrator can ensure that that the user has the appropriate editing, creation and security rights for their job function.

In one embodiment, prior to establishing the user account the rights management and licensing system 100 verifies that the e-mail address or other authentication identifier is unique. If the e-mail address or other authentication identifier is unique, a password may be generated for the user. If the e-mail address or other authentication identifier is not unique, the system optionally does not allow the account to be created and requests a unique e-mail address.

Once the user account is created, an e-mail or other notification 236 is sent to the user welcoming the user to the rights management and licensing system, including a description of the rights management system, and the level of access the user has based on the user group specified by the administrator. A hyperlink is optionally included in the notification, activation of which causes the user's browser or other application to access the rights management and licensing system 100.

When a user logs into rights management system 100 for the first time at state 238, the user may be required enter or update some or all of the remaining un-entered account information, such as the user's phone number, facsimile number, address or other contact information. The user may also choose a password. Optionally, the administrator can edit the user provided information. An example completed account includes the following:
  Last Name
  First Name
  E-mail Address (optionally not changeable by the user)
  Language Preference (selected from a drop-down list)
  Company Name (optionally not changeable by the user)
  User Group (optionally not changeable by the user)
  Password
  Confirm Password
  Phone
  Fax
  Address Line 1
  Address Line 2
  City/Province
  State (selectable from a drop-down list)
  Zip Code
  Country (selectable from a drop-down list)

As can be seen from the above example, some of the fields cannot be edited by a user while others can be, and some of the items must be selected from a drop-down list. In other embodiments, all of the fields can be edited by a user, and all of the items can be entered by keying in the item, rather than selecting from a predefined list.

The seller may then add a list of properties at state 240 and add a list of corresponding rights at state 242. At state 240, the seller can add intellectual properties to the central rights repository 104 in association with the seller's account. The seller is prompted to specify what type of property the seller or user would like to add. For example, the property type may be of type Film, Television, Music, Comic, and so on. Once the property type is identified, one or more blank fields for items related to that property type are displayed for the user to populate.

For example, if a Film property is being added, the following fields may be presented for completion:
  Producer
  Director
  Screenwriter
  Stars
  Genre
  Type (movie of the week, mini-series, theater film, pay-per-view, basic cable, etc.)
  Availability
  Term start
  Term end
  Rights If the property type is Comic, then fields related to Comics are displayed, such as the following example fields:
  Issue Number
  Issue Title
  Volume Number
  Artist
  Number of Pages Series Type
Availability
Term start
Term end
Rights The user or seller can upload sample or preview media, such as images, streaming or downloadable video and audio, to the rights management and licensing system's central repository 104 for viewing by or listening to by potential buyers.

The seller and/or potential buyer can then later view all information related to a specific property. Property information can be viewed after a specific search, or after property information has been added or updated. All fields are read-only in a view mode. A property update mode allows the seller to update or edit the property information.

Using the rights owner or manager application, the seller can add, delete or otherwise amend the available rights associated with a given property. Upon a user requesting to add a right, the rights owner application prompts the user to identify or select the property to which a right is to be added, and to specify the type of rights that is to be added (i.e., Publishing, Syndication, Merchandising). Once the "Type of Right" has been identified, blank fields for required items related to that Type are displayed to the user. By way of example, if the right of Merchandising is being added to the film property "Summer Bash I", the required fields may include number of units, samples, approval requirements, and the like.

In addition, the seller can view, update, or remove a right. A right, including all entered information related to that right, can be viewed for review immediately after adding or updating the right, or can be viewed following a search on an existing right. In the view mode, the fields are read-only. A rights update mode allows the seller to update or edit the rights information. In addition, the seller can delete, or mark as deleted, a given property record. For example, if a right has been involved in a transaction of any kind such as a Request, License agreement or Sale, then the right record may be archived, rather than deleted for tracking purposes. However, if the right has never been used in any type of transaction then it can be deleted from the system.

In addition, the rights owner application 102 provides performance-monitoring tools that provide detailed information about user activity. Lists are generated detailing when a given user logs in, how long they stayed logged into the system, and what tasks they performed. Graphical reports may be generated illustrating the activity levels.

Once the seller has provided the appropriate information and set up the appropriate templates for a property and its associated rights, the property rights can then be licensed to licensees or buyers. For convenience, both a buyer and licensee will be referred to as a buyer.

The initial interaction with the buyer is handled by a property finder search function. The buyer can complete a series of questions to identify the desired property or properties. For example, the buyer may be requested to specify property type, title, right, territory, language, term, and so on. These questions are pre-determined by the seller using the request template described above. The rights management and licensing system 100 then queries or searches the rights central repository 104 to determine which properties, if any, fulfill the buyer specifications. Once the query is completed, the returned information can be displayed substantially immediately to the buyer. The buyer can then fill out a specific request for a specific property. As each request is received, the seller can review the request to determine whether to accept, reject, or provide a counter-offer to the request. At each state of processing the request, the request status is tracked and optionally status notifications are provided to the seller and/or buyer. If the buyer accepts the request, the buyer attaches to the request an appropriate license agreement generated using the license agreement template, as previously described. The buyer can modify the license agreement for the specific transaction without affecting the previously generated template. The request and attached license agreement is sent to the seller.

In addition to the property rights owner, customers of the rights owner may be given limited rights to modify the templates and view information. A customer may include any number of intellectual property buyers and sellers that utilize the rights management and licensing system 100. An individual or organization that collaborates with the intellectual property buyers and sellers and assists them in transactions involving intellectual property, such as accounting services, legal services and the like, may also be referred to as customers, or as partners. Partners may be given more rights than consumer customers. For example, partners may selectively be given the right to sales information related to other customers. The administrator can add new customers, edit information about existing customers, remove customers, and assign each customer system privileges. In setting up a customer account, the administrator enters the customer's company name, the name of the company's designated administrator, the company's e-mail address, language preference, and user group privileges. The rights management and licensing system administrator can update the company information. In addition the rights management and licensing system administrator can delete a customer.

Figure 3A:
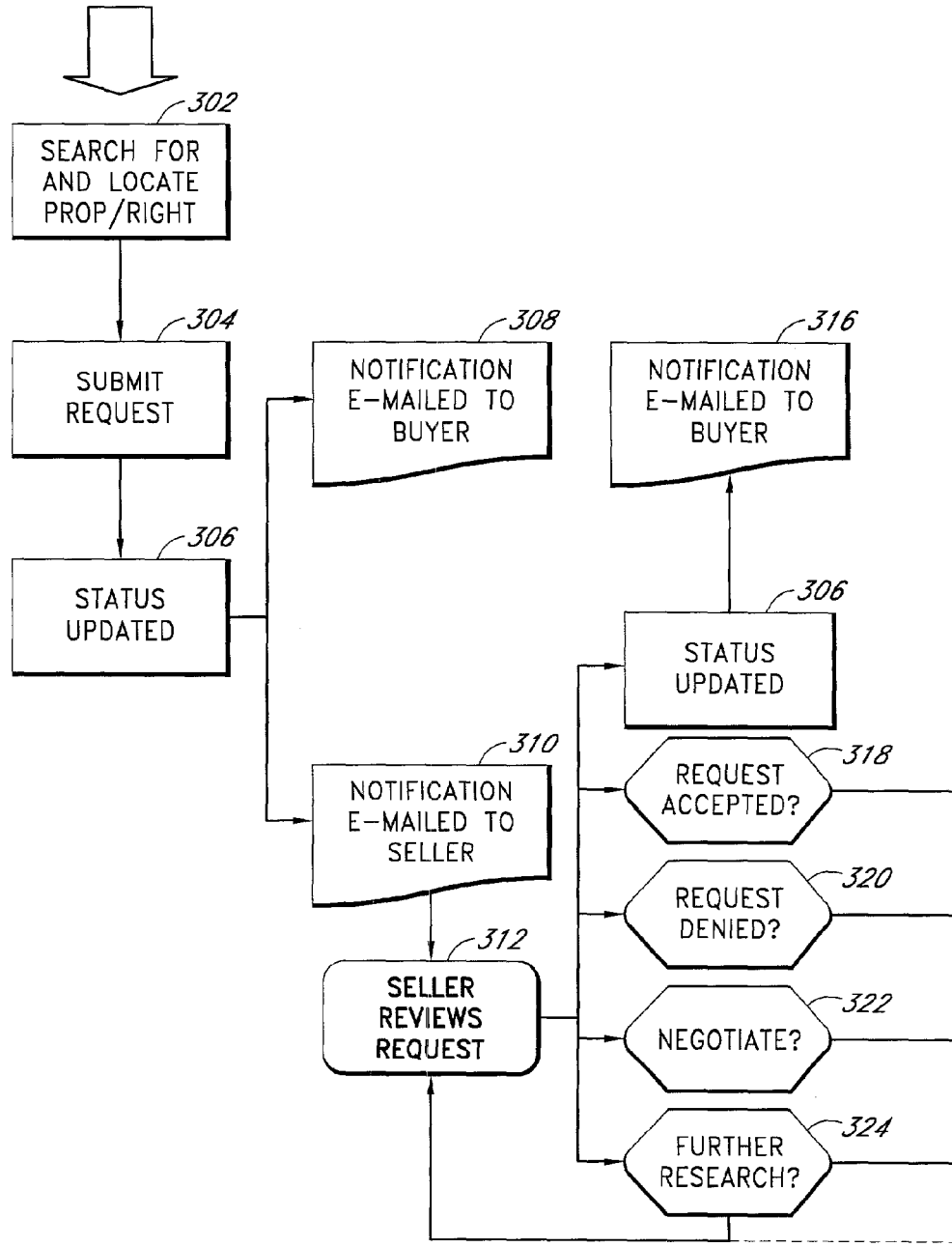

FIGS. 3A and 3B illustrates an example transaction process for licensing or purchasing intellectual property rights for a given property. The process can be used by one or more rights owners to license to license or sell their rights. However, the process can advantageously be reconfigured or modified by a rights owner so as to meet the rights owner's particular needs. Thus, as discussed below, the rights owner can, for example, indicate who is to be notified at different stages of a licensing transaction, how they are to be notified, how and if negotiations are to be conducted, who has authority to authorize a license, the type of information required by the licensee, and so on. Further, the seller or licensor can configure which system entities, such as the properties, rights, requests, agreements, quotes, agents, licenses, licensees, and licensors, as well as which attributes for each entity, such as MPAA rating, genre, right, territory, language, term start, term end, licensee name, licensor name, request date, and agreement date, can be used as searchable parameters by a rights search engine. The rights owner can specify what information is required from a potential licensee who wants to submit a license request. Further, the licensor can configure which steps during the licensing transaction process require a request status update. The rights owner can configure the licensing workflow process by defining steps, status, actions, and user notification rules. The workflow rules can be stored in the rights repository and dynamically returned to the rights exchange application via the rights licensing application.

In addition, the rights owner can configure notification rules for the licensing process. For example, the rights owner can specify for which status or at which licensing workflow process states a notification needs to be sent. Further, the rights owner can specify the type of notification message that should be sent. The rights owner can specify that the notification is to be provided in the form of an email, a pager message, a message to a wireless device, a fax, or the like. The rights owner can specify the type of user that should be notified, for example whether a rights owner, buyer, request reviewer, or request approver, as well as the notification content. The notification rules can be stored in the rights repository and dynamically returned to the rights exchange application and rights intelligence application via the rights licensing application.

Further, for each status, or state, in the licensing process described below, the rights owner can configure what actions can be performed by each type of user. For example, the rights owner can specify if rights owner, buyer, request reviewer, or request approver, can accept a licensing request, deny a licensing request, negotiate the licensing request, research the licensing request, and so on. The workflow rules can be stored in the rights repository and dynamically returned to the rights exchange application and rights intelligence application via the rights licensing application.

Thus, the illustrated transaction process is just one example of a process in accordance with the present invention.

A buyer begins the transaction process at state 302 by searching for available properties and associated property rights. The licensor can configure which system entities, such as properties, rights, requests, agreements, licenses, licensees, licensors, and the like, as well as which attributes for each entity, such as MPAA rating, genre, right, territory, language, term start, term end, licensee name, licensor name, request date, agreement date, and the like, can be used as searchable parameters by the search engine. The search engine rules can be stored in the rights repository and dynamically returned to the rights exchange application via the rights licensing application. The buyer then conducts the search using a search engine that searches through the central repository 104. The buyer defines the search parameters by specifying such system entities as properties, rights, requests, agreements, licenses, licensees, licensors, and so on, and by defining the search parameters for the attributes for each entity, such as MPAA rating, genre, right, territory, language, term start, term end, licensee name, licensor name, request date, agreement date, and the like. The search engine searches through the rights repository 104 and returns a list of available intellectual properties matching the search criterion.

Assuming the buyer locates and selects one or more suitable intellectual properties, the buyer then submits a request to license or buy the desired rights at state 304. The information that the buyer must provide in order for the license request to be successfully process can be configured by the licensor using the rights owner application by defining "license request templates," as discussed above. The template can be stored in the rights repository and dynamically returned to the rights exchange application via the rights licensing application.

For example, the buyer may be requested or required to provide the rights management and licensing system with contact information, such as company name, buyer name, intended use, the intellectual property rights desired by the buyer and the like to the licensing application, which submits this information for storage to the central repository 104. The buyer may also indicate if the licensor's terms are acceptable or the buyer can suggest alternative terms. The status of the selected intellectual property right in the central repository 104 is set to "requested" at state 306. The intellectual property licensor will thus be able to keep track of request activity. In general, the licensor can configure or define which steps during the transaction process require an update to the status of the request. The configuration of the licensing workflow process can include defining steps, status, actions, and user notification rules. The workflow rules can be stored in the rights repository and dynamically returned to the rights exchange application via the rights licensing application.

At state 308, the buyer is notified that the request has successfully been received by the rights management and licensing system 100. As previously discussed, the licensor can configure the rules associated with notifications. For example, the licensor can specify which status or step during the licensing workflow process will cause a notification to be sent, the type or form of the notification message (email, pager, wireless device, fax, and the like), the type of user that should be notified (buyer, licensor, request reviewer, request approver, and the like.), and textual content of the notification. The notification rules can be stored in the rights repository and dynamically returned to the rights exchange application and rights intelligence application via the rights licensing application. In this example, the buyer has configured the workflow to cause notifications to be sent at states 308, 310, 344, 356, and 358.

In this example, a notification 310, in the form of e-mail or other messaging medium, notifies the licensor of the request. The notification 310 includes the name of the property, the requested rights, the identity of the buyer, the buyer contact information, and whether the licensor's terms have been accepted or whether the buyer has proposed alternative terms.

As each request is received, the licensor can review the request at state 312 using the rights intelligence application to determine the next appropriate step in the process. Once the request notification has been sent to the licensor or the licensor otherwise has accessed the request information, the status of the request and the status of the selected intellectual property right in the central repository is updated at state 314 to "under review by the licensor." A notification 316 that the licensor is reviewing the request is sent to the buyer, thereby keeping the buyer aware of the progress of the request.

For each status, or step, in the licensing process the licensor can configure what actions, such as accept request, deny request, negotiate, perform research, and the like, can be performed by each type of user, for example, by the buyer, licensor, request reviewer, request approver, and the like. The workflow rules can be stored in the rights repository 104 and dynamically returned to the rights exchange application 108 and rights intelligence application 102 via the rights licensing application 106. For each status, or step, in the licensing process the licensor can configure or specify what actions can be performed by each type of user. For example the licensor can specify if the buyer, licensor, request reviewer, request approver or the like can accept a request, deny a request, negotiate, perform research, or the like. The workflow rules can be stored in the rights repository and dynamically returned to the rights exchange application and rights intelligence application via the rights licensing application. In this example, the licensor can accept the buyer's request 318, reject the request 320, choose to negotiate with the buyer 322, or, at state 324, may conduct further research into the buyer's request, including into the buyer's background, intended use of the property and other criterion. Such actions by the licensor may be reflected in real time on the licensing application 106, so that the buyer can view the licensor's response. If the licensor accepts the buyer's request, including offer terms, at state 318, a deal memo, a licensing agreement, or a purchase agreement incorporating the agreed upon specified terms, is generated.

If the licensor decides to negotiate the buyer's request at state 322, the licensor specifies new or modified terms in a counteroffer at state 330. If the request is denied at state 328, the owner can optionally specify or explain why the request was denied.

Documents can be dynamically generated, merging information from the buyer's license request with a document template that presents the data in a desired format. The licensor can configure the rules associated with document generation such at defining a document template, what type of template it is to be use for, such as a reply to a licensing request, a denial letter, a license quote, a license agreement, and the like. The licensor can also specify at which state during the during the licensing process the document is to be used, which data elements should be merged into the template, and in what format the document should be generated, such as RTF, Postscript, Word, PDF, and the like. The document generation rules can be stored in the rights repository and dynamically returned to the rights exchange application and rights intelligence application via the rights licensing application.

Actions during the transaction process that can be construed as legally binding may require authentication of the system user. Certificates, digital signatures, public/private key infrastructure (PKI) and the like, may be managed by the rights licensing application and the rights repository to validate the transaction.

After completion of states 326, 328, or 330, the rights repository database is updated at state 332 to reflect the current status of the transaction with respect to the right or rights at issue. The license agreement, rejection, or counteroffer is messaged to the buyer via e-mail 334 or the like and the status in updated, assuming that is how the buyer configured the workflow. As previously discussed, the licensor can configure which steps during the transaction process require an update to the status of the request and when and how a notification or message is to be provided.

The buyer reviews the request response at state 336. The buyer can elect to accept the terms 338, reject the terms 340, or negotiate the terms 342. Upon such election, the repository database 104 is updated at state 348 to reflect the current status of the transaction with respect to the right or rights at issue, and a notification 354 is sent to the licensor, assuming that is how the buyer configured the workflow. As previously discussed, the licensor can configure which steps during the transaction process require an update to the status of the request and when and how a notification or message is to be provided.

If the buyer accepts the terms, the buyer can elect to pay by credit card 350 or purchase order 352 and the repository database 104 is accordingly updated at state 354, assuming that is how the buyer configured the workflow. Notifications 356, 358 are accordingly submitted to a finance department and a delivery department. In one embodiment, the rights owner may solely handle payment and delivery of the rights. The notification to the finance department includes a notification of the sale and the associated payment terms. This procedure helps streamline communications, helping ensure that invoices can go out in a timely manner. The finance department processes the payment and the delivery department delivers the property. Delivery may be performed by actually mailing or couriering the property to the buyer using services such as Federal Express. Optionally, if the property is in a digital format, such as digitized audio or video, in some instances the buyer can download the property using the exchange application 108.

In particular, the licensor can configure delivery rules for both analog and digital asset. Upon completion of the licensing transaction, as defined by the licensor, the rights repository may store the digital asset, or a reference to the digital asset stored in another repository such as one used by a digital asset management (DAM) system or a media asset management (MAM) system. Digital delivery of the asset may also include digital protection to prevent copying, altering, or otherwise tampering with the digital asset. In embodiments where such digital delivery is provided, delivery rules are stored in the rights repository and include the necessary information needed to communicate with the digital delivery system such a digital rights management (DRM) system, secure streaming media server, and the like.

If the buyer wants to negotiate at state 342, then the buyer specifies new or amended terms in a counter offer at state 344, which is sent to the buyer via e-mail 354. The licensor can then again review the request at state 312, as described above.

In one embodiment, a delivery/service system, included within the rights management and licensing system 100, manages the payment process and/or delivery of the intellectual property. The service system may perform various tasks including security monitoring, disaster control, and customer service.

In one embodiment, the licensing process for a given property can be completed automatically, without manual intervention on the part of the licensor. For example, the license terms may be fixed and not subject to negotiation. A workflow process guides the potential licensee through the licensing process. The workflow process receives a potential licensee's request for a given property and associated rights, determines if those rights are still available, and provides the predetermined license terms. If the licensee agrees to the licenses terms and provides payment, the license can automatically be granted without requiring manual intervention on the part of the owner/licensor.

The process of locating desired intellectual property rights will now be described in greater detail. For most prospective buyers or licensors of intellectual property rights, a first step is to search for intellectual property rights and their availability. The buyer can conduct a search using a search tool provided by the licensing application 106 for finding property and/or associated rights. In one embodiment, the buyer completes a template of questions to identify property specifics such as property type, title, right, geographic and/or commercial territories in which rights are desired, and so on. The search tool can then query the repository to determine which, if any, items fulfill the requirements provided by the buyer. The search results are made available to the buyer, who may then save the results, conduct further research on specific intellectual property rights, and/or make an offer to purchase specific intellectual property rights. Optionally, the search results may include intellectual property rights that meet a pre-determined number of, but not all of the specified requirements.

Figure 4:
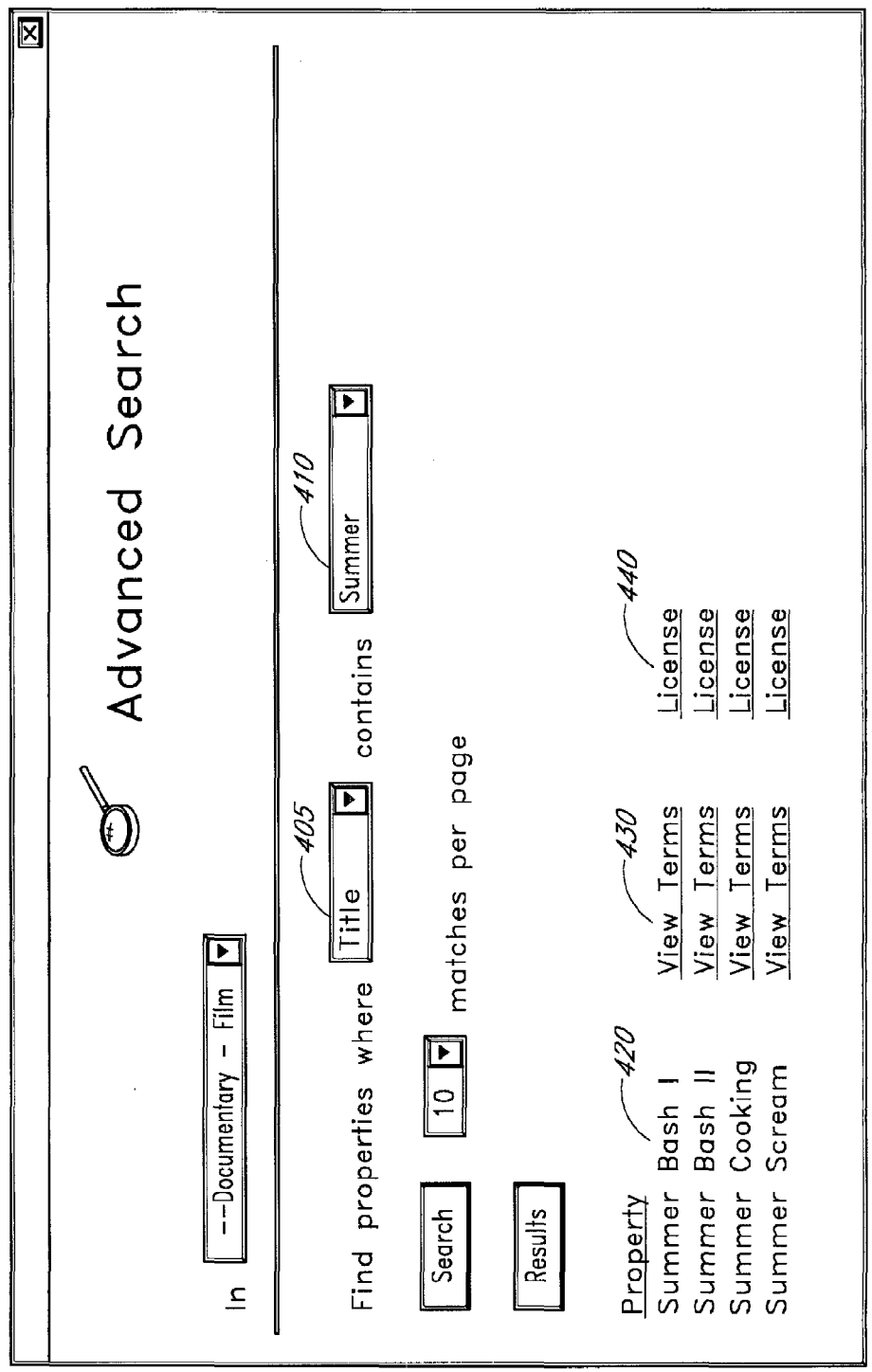
FIG. 4 illustrates an embodiment of a search page.

An exemplary search page is illustrated in FIG. 4. The buyer can specify the search criteria using a first menu field 405 and a second field 410. In this example, the buyer has chosen to search for a documentary film whose title contains the keyword "summer." The user can specify other search criteria, such as territory, language, format, genre, and so on using the drop down menu 405. In this example, four results 420 are found in the repository 104 and are displayed. If the buyer is interested in one or more of the properties, the buyer may then view terms for obtaining the intellectual property by activating the corresponding terms link 430. The terms may include such information as term availability of rights, asking price by licensor, and other information such as number of requests for that property. The buyer may then select one or more rights that the buyer desires to purchase or license by selecting a corresponding link titled "license" 440. The buyer may then be required to provide information requested or specified by the licensor, such as the buyer's name, company information, intended use of the intellectual property and the like, in order to submit a request to purchase or license intellectual property rights.

As previously discussed, one advantage provided by an embodiment of the present invention is that the disclosed rights management and licensing system includes a collection of integrated tools that enable users, such as intellectual property rights owners, to manage information about their properties and rights. Accordingly, the intellectual property rights owner may create a personal library of intellectual property rights by adding intellectual property information and specifying which category each property be identified with utilizing the owner's application. The owner may provide such information as title, a synopsis of the property, contributors to the property, characteristics of the property, images, video and/or music clips, and the like.

FIG. 5A illustrates a sample page, in which the owner can view a list 520 of owned properties. Here, the first page of 20 pages of properties is displayed. The owner can see when the individual properties were added to the list of properties 520. The owner can also see the number of rights associated with each property 530. Selecting the underlined links may display additional information. For example, selecting the underlined link stating the number or rights 530 for a given property will display which rights are owned and which are licensed out. The owner may also edit, delete, and add new rights to each property by activating an 'Add new Rights' link 540. The owner may add new properties by activating an 'Add new Properties' link 550 and also delete select properties by activating an 'Delete new Properties' link 560.

As previously discussed, the rights owner application 102, in one embodiment, enables the owner to easily edit information already entered. The owner can also create a new property entry with descriptive elements identical to another property and then edit some descriptive elements to create an entirely new property entry. An assistant wizard may be provided by the rights application 102 to aid in entering and updating all such information. The rights owner application 102 may also provide other help. For example, a dynamic pricing matrix specifying base price for licensing or sale of property rights based on such factors as territory, language, term, and rights requested, may be provided.

Figure 5B:
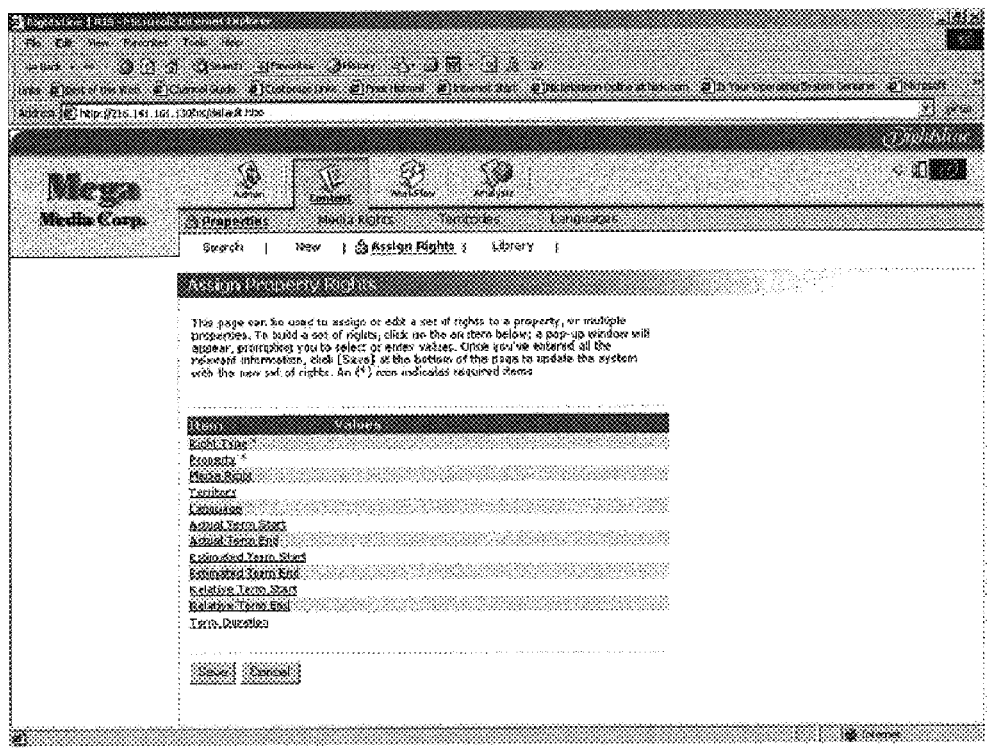
Figure 5C:
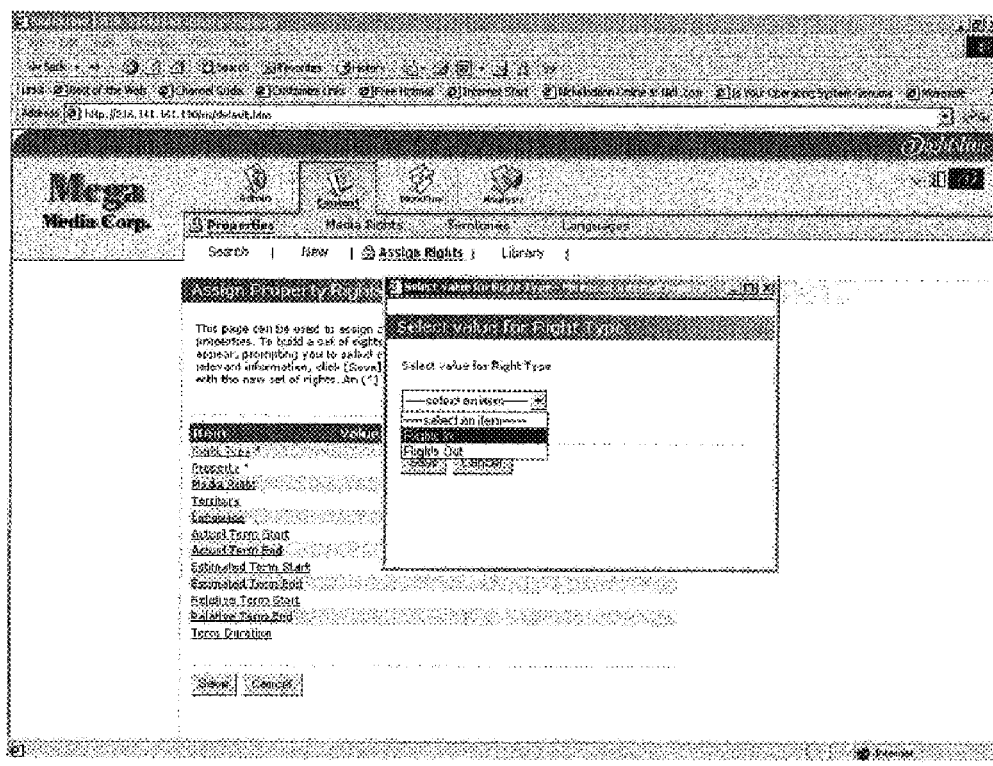

FIGS. 5B–5K illustrate further example user interfaces or forms for assigning rights to a property or properties and/or modifying rights assigned to a property or properties. As illustrated in FIG. 5B, by selecting or activating an appropriate link a licensor can select the right type, property, media right, territory, language, actual term start, actual term end, estimated term start, estimated term end, relative term start, relative term end, and the term duration. FIG. 5C illustrates the interface and menu presented if "right type" is selected, wherein the licensor can choose from a type of "Rights In," that is, rights owned or acquired by the licensor, and a type of "Rights Out," that is, rights sold or licensed out.

Figure 5D:
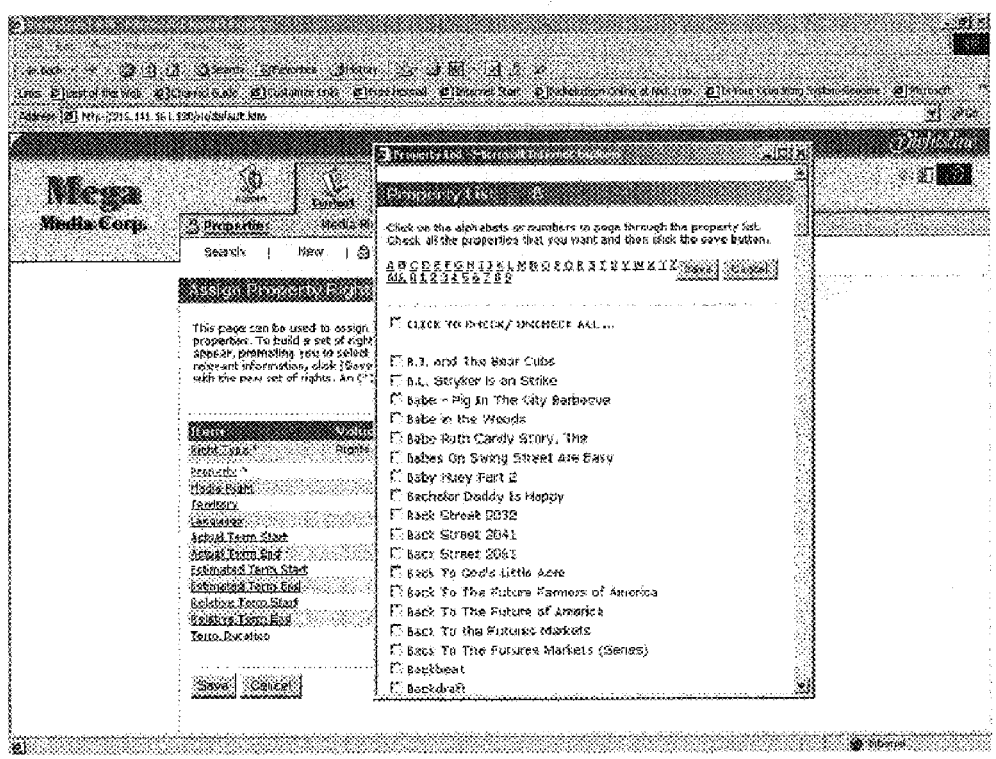
Figure 5E:
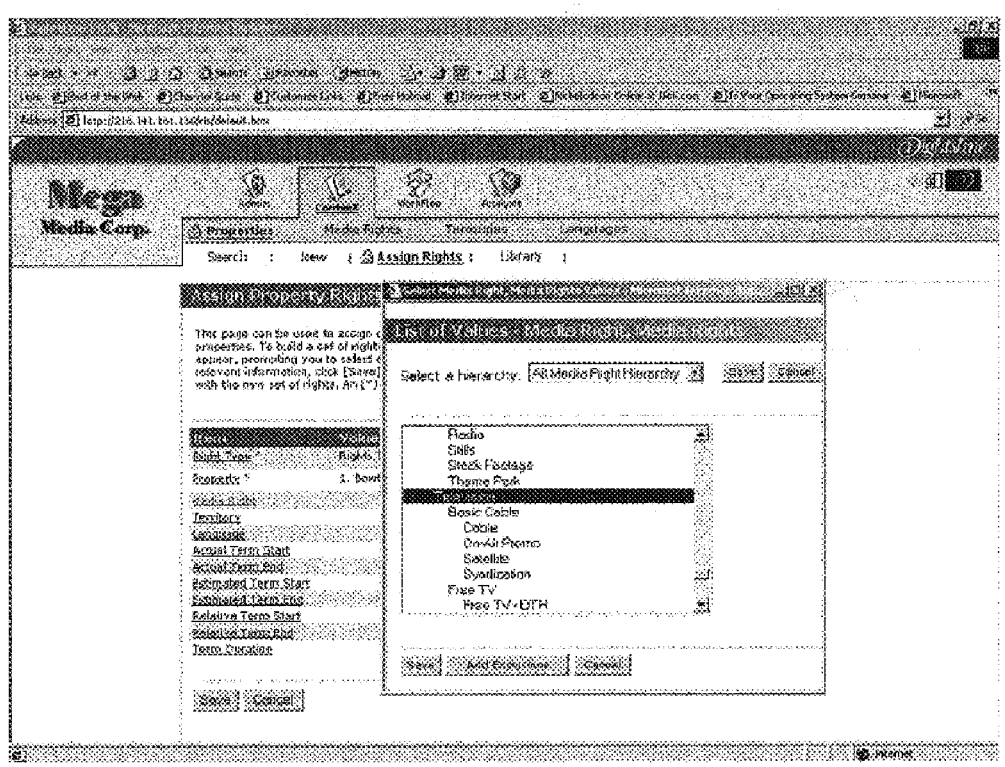

FIG. 5D illustrates the interface and menu presented if the "Property" link illustrated in FIG. 5B is selected, wherein the licensor can choose from a list of the properties that the licensor owns or is entitled to license out. FIG. 5E illustrates the interface and menu presented if the "Media Right" link illustrated in FIG. 5B is selected, wherein the licensor can choose from a list of media rights, such as radio rights, stills, stock footage, television, and the like, that the licensor is offering. The licensor can select media rights categories using different degrees of granularity. For example, the licensor can select the level "Television" to select all television related rights. Alternatively, the licensor can select at a lower level the "Satellite" and "Syndication" rights, by way of example. The licensor can select the hierarchical level from which the media rights will be selected. For example, one hierarchical level can be an "A Standard Rights" hierarchy level, while another hierarchical level can be an "Alternative Media Right" hierarchy level. The licensor can select one or more of the listed media rights.

Figure 5F:
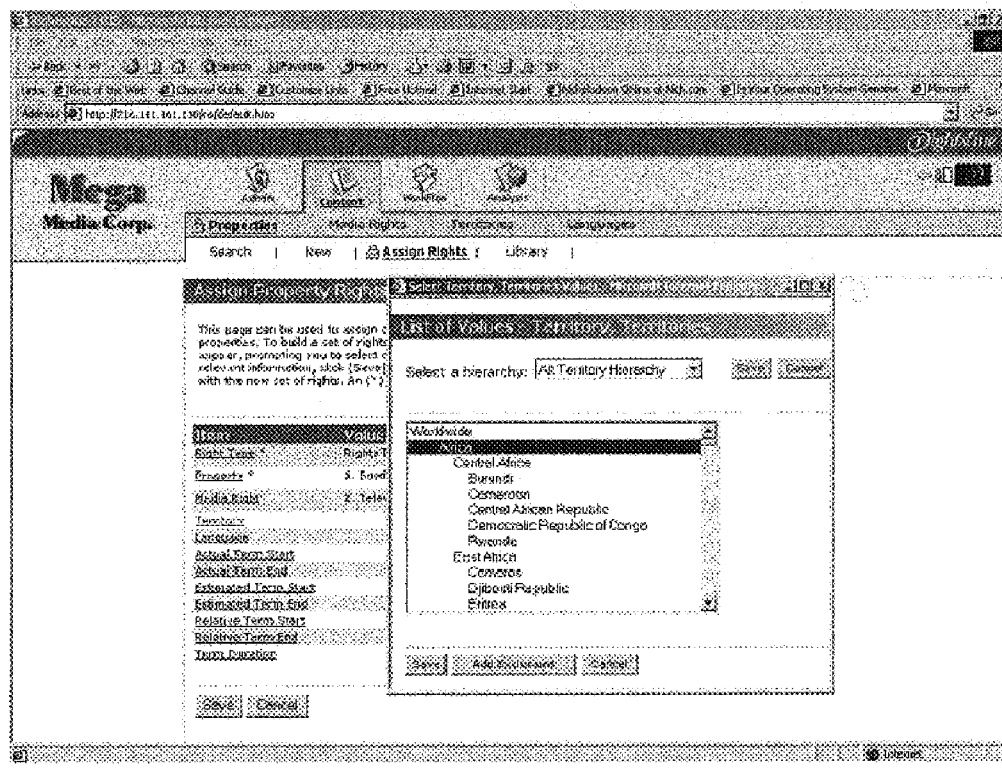
Figure 5G:
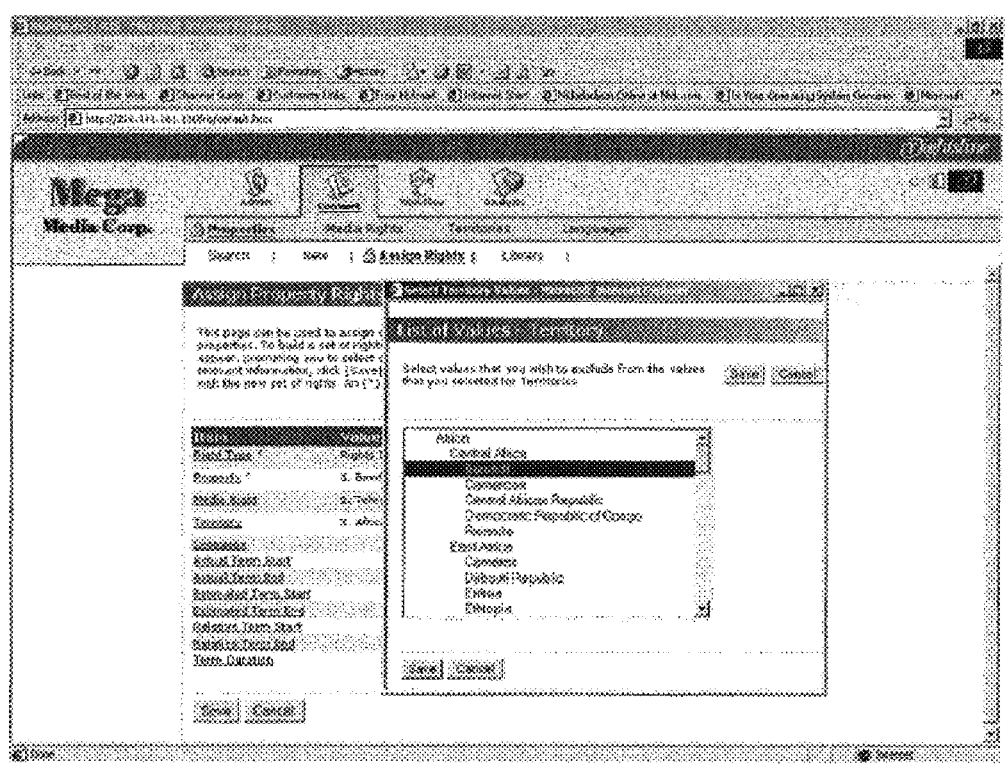

FIG. 5F illustrates the interface and menu presented if the "Territory" link illustrated in FIG. 5B is selected, wherein the licensor can choose one or more territories from a list of the territories in which the licensor is entitled to or wants to license out rights. The licensor can select using different degrees of granularity, such as worldwide, an entire continent, a region, a country, a state, or a city. For example, the licensor can select the level "Africa" to select all of Africa. Similarly, the licensor can select "Europe" to select all of Europe, or "Italy" to select just Italy. Alternatively, the licensor can select at a lower level "Central Africa" to select all of central Africa, or, as illustrated in FIG. 5G, the licensor can select individual countries within central Africa, such as Burundi, by way of example. The licensor can select the hierarchical level from which the media rights will be selected. For example, in the illustrated example, a hierarchical level "Alternative Territories" is selected, where the territories are presented as ordered by continents. Another hierarchical level is termed the "Territories by Language" hierarchical level, where territories are grouped together by dominant language. Thus, for example, all French-speaking countries would be shown as falling under the category "French," while all English-speaking countries would be shown as falling under the category "English."

Figure 5H:
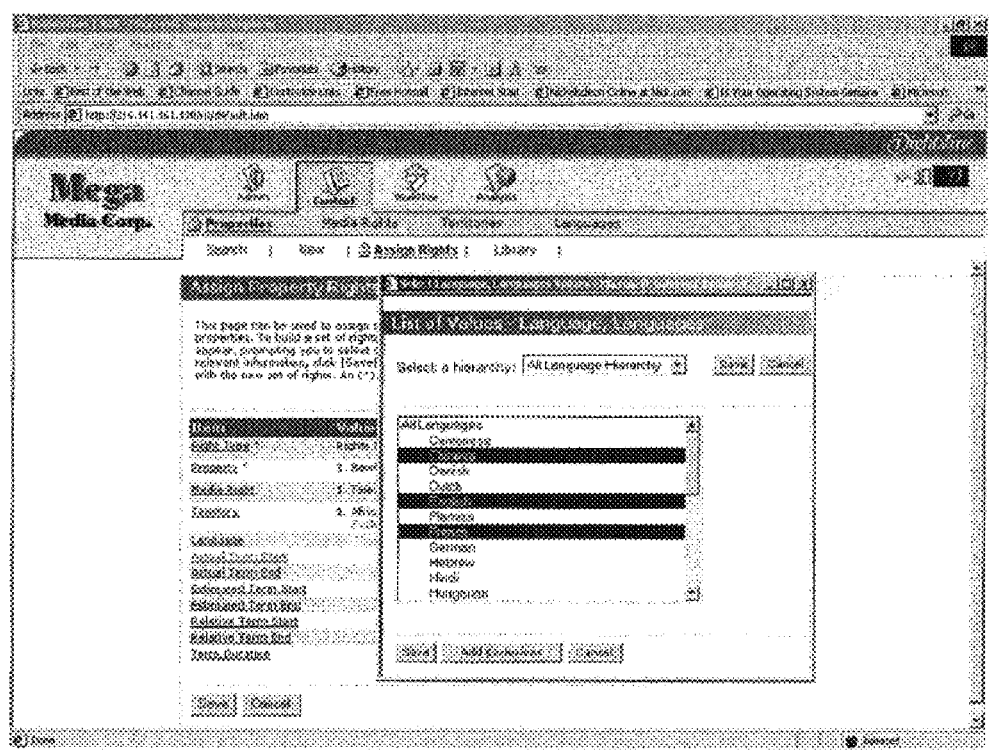

FIG. 5H illustrates the interface and menu presented if the "Language" link illustrated in FIG. 5B is selected, wherein the licensor can choose one or more media languages in which the licensor owner is entitled to or wants to license out rights. The licensor can select using different degrees of granularity, such as all languages or one or more selected languages.

Figure 5I:
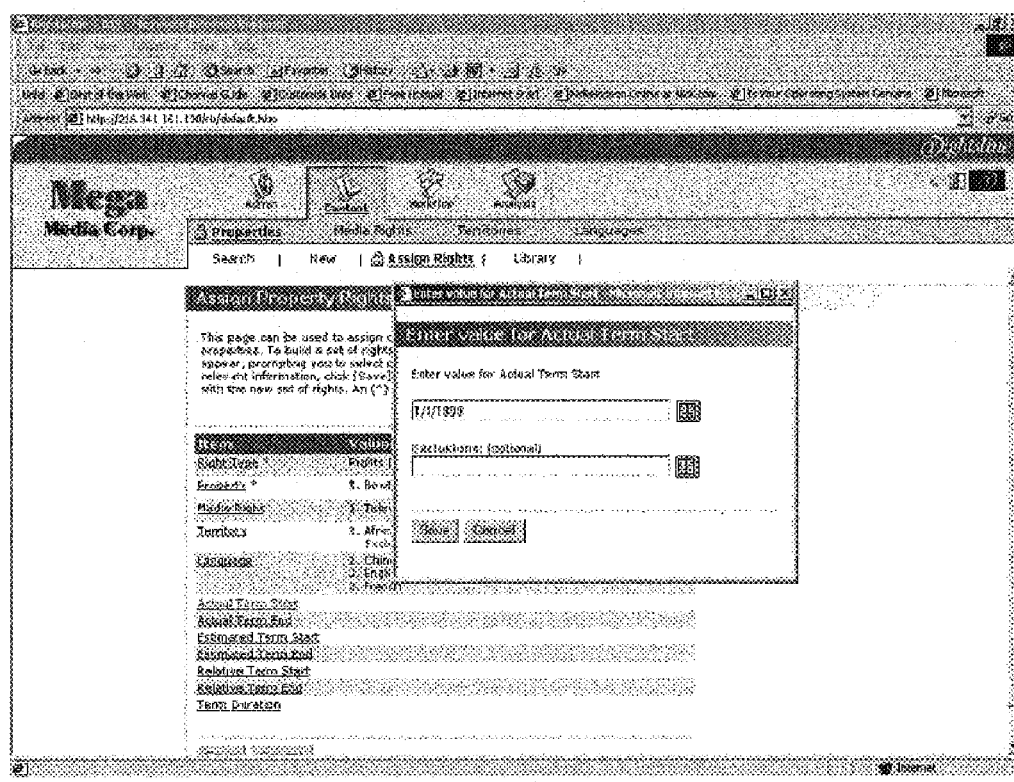

FIG. 5I illustrates the interface and menu presented if the "Actual Term Start" link illustrated in FIG. 5B is selected, wherein the licensor specifies the actual term start date and any specific exclusions, such a exclusion period start dates.

Figure 5J:
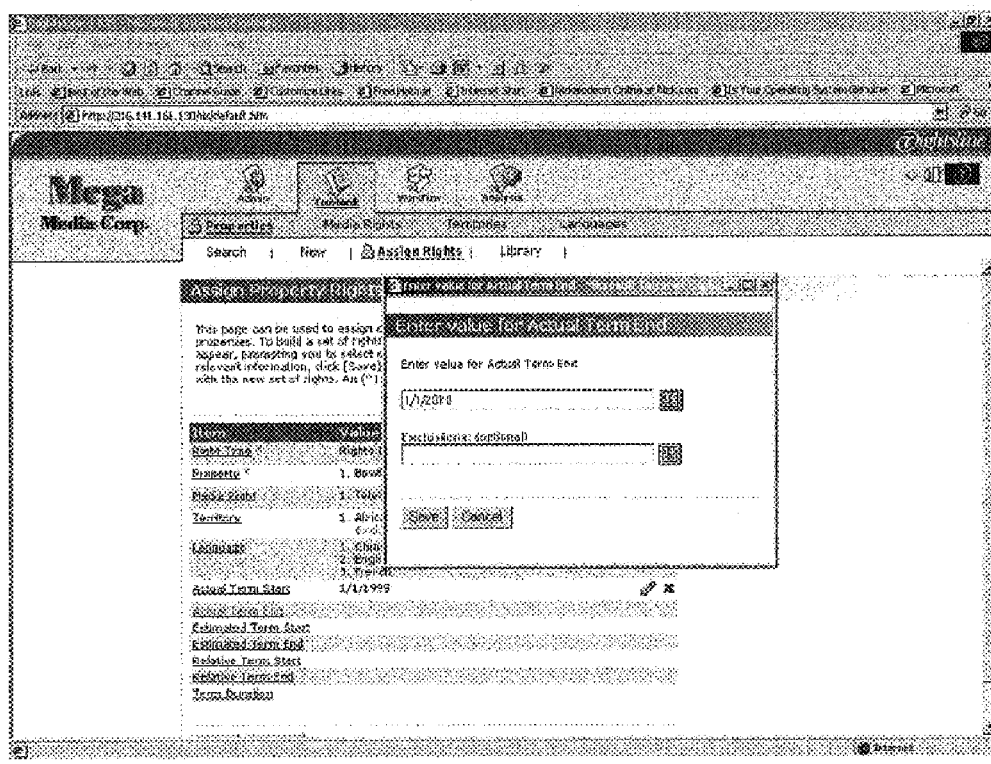

FIG. 5J illustrates the interface and menu presented if the "Actual Term End" link illustrated in FIG. 5B is selected, wherein the licensor specifies the actual term end date and any specific exclusion end dates.

Figure 5K:
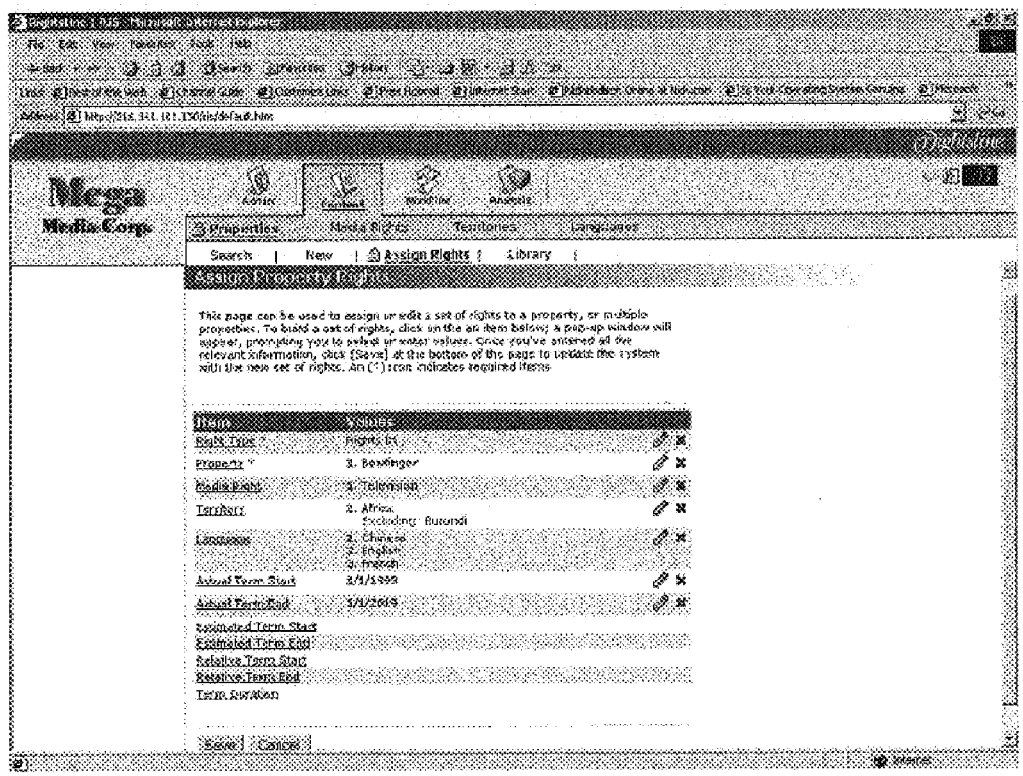

FIG. 5K illustrates the completed property rights assignment form.

Another significant, though optional, component of the owner's application is a collection of tools to help owners understand what they own and understand which of their properties and corresponding intellectual property rights are available for sale and/or licensing. In one embodiment, a library analysis tool may assist the owner in reporting and interacting with information in the owner's library. For example, the library analysis tool may provide the owner with reports which may be standard reports containing a breakdown of the owner's properties and respective rights, or may be more advanced reports providing data in several formats enabling comparison of data in several configurations.

Additionally, interactive tools enabling the owner to conveniently find which properties are the most profitable, track daily requests for properties or other transaction related events may also be provided. For example, a buyer may be able to view the status of any current of historical activity. The licensor may not only have information at a buyer specific level, but also statistical information regarding types of properties requested, dollars generated by territory, and so on. Licensors may also be able to access reports containing web-based data on number of hits to licensor's properties, top properties, and so on.

The rights licensing application 106 will now be described in greater detail. The rights licensing application 106 provides real time access to information about property and related rights availability to the rights exchange application 108 and remote applications 110 utilizing third party software, which may be used by buyers. In one embodiment, a real time licensing engine accepts requests for information, interprets the requests, and makes the appropriate calls to the underlining system components.

The real time licensing engine may accept and interpret licensing requests in different forms, representing various levels of complexity and security. An HTTP post method accepts a request for information by receiving the request through an Active Server Page (ASP), which interrupts elements and their values from an external web site or application. The request is then parsed and the actual request parameters are passed on to a request broker. A second method of accepting a request for information includes using a COM component to receive a request through a designated port using two separate components, one on the client's server and the other in the licensing application. The information may also be encrypted using any number of commonly available encryption routines.

In one embodiment, the central rights repository 104 is used to determine the availability of intellectual property rights through a bi-directional hierarchical navigation process and by extracting implied data relations. Other embodiments can use conventional techniques.

The repository 104 may perform data management by inference rather than by direct reference. In this embodiment, the intellectual property rights owner specifies only the most or more general level of rights owned, and the most or more general level of rights licensed out.

In contrast to conventional systems that perform data management by direct reference, one embodiment of the present invention performs data management by inference, that is, by finding implicit relationships. The central rights repository 104 determines the availability of rights through implicit relationships when a query for specific rights is made. This novel process provides a faster, more efficient technique to determine the availability of intellectual property rights than that provided by conventional intellectual property rights management systems. Such a system for determining availability of rights requires minimal data entry on the part of the owner, and provides efficient information retrieval and rapidly determines available rights. In contrast to the disclosed process, conventional intellectual property rights management systems answer queries regarding available rights by combing through numerous, large, and explicit tables of rights.

In a conventional rights availability database, the number of data elements required to track ownership of rights grows rapidly. For example, suppose a user wanted to track the intellectual property rights associated with a motion picture. Conventionally, a large number of data elements would have to be captured and stored in the database to uniquely identify the set of rights associated with fields like geographical territories, term duration, language, and the like. In a similar fashion, the number of records required for rights licensed out can grow rapidly as well. For example, the same right can be sold in the same territory, in the same language, to multiple licensees for different time periods, thus requiring a number of records to be created and stored. Conventionally, when a search request is made, a query is run against large tables containing information regarding available and licensed rights.

Figure 6:
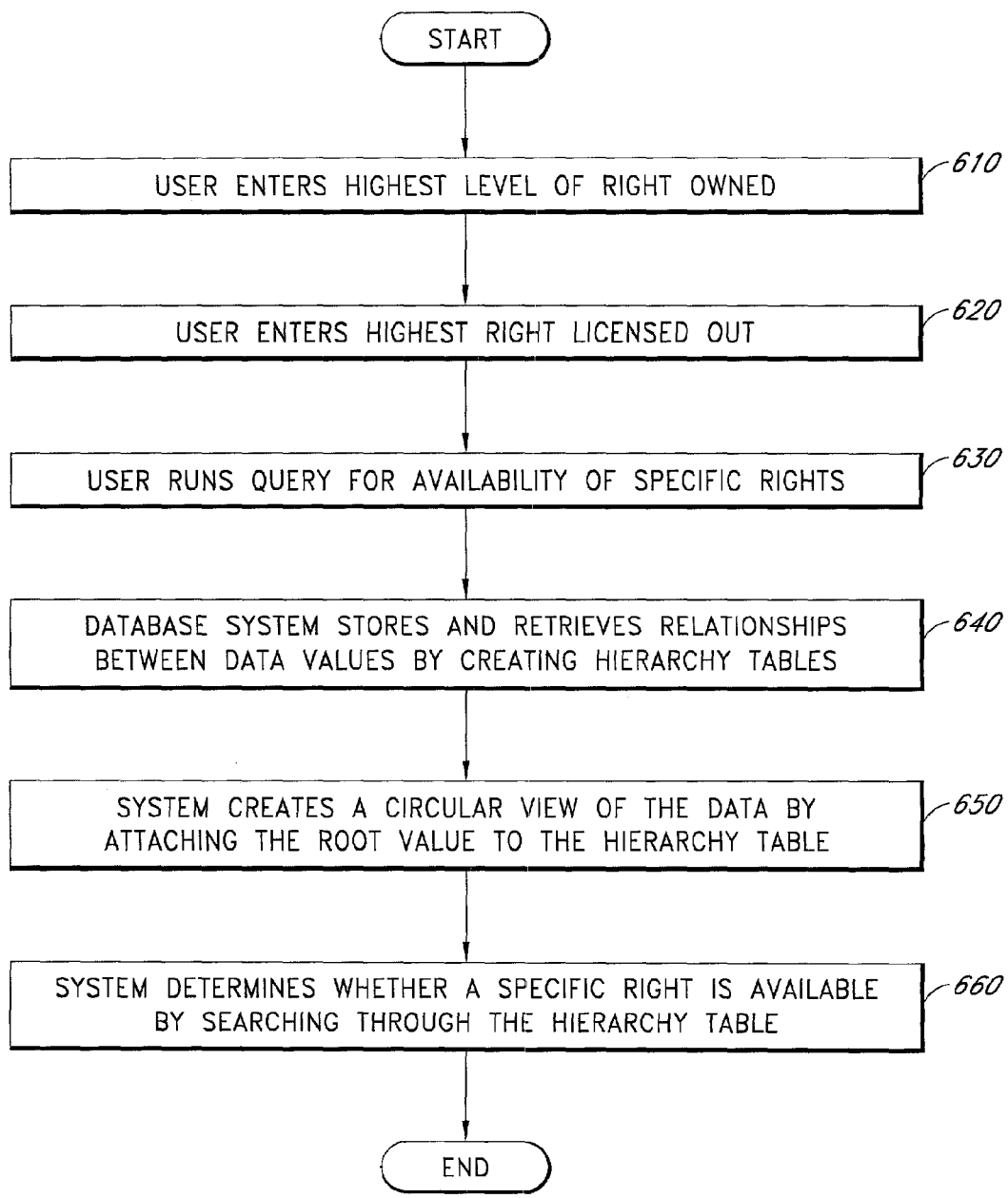
FIG. 6 illustrates an exemplary high-level flow diagram of a process for determining the availability of rights associated with a property.

In contrast, a bi-directional navigation and implied data relations database, in accordance with one embodiment of the present invention, performs data management by inference. FIG. 6 illustrates an exemplary high-level flow diagram of a process for determining the availability of rights associated with a property. As illustrated in FIG. 6, the owner enters the highest level of rights owned 610 and the highest level of rights that have already been licensed 620, and runs queries to determine if a specific right is available for a given piece of intellectual property 630. The implied relations database utilizes the fact that most data elements such as rights, territories, languages, terms and the like have a hierarchical or a multi-level structure. A relational database management system stores and retrieves relationships between data values by creating hierarchy tables 640. To avoid running multiple queries, a more circular view of the data is then dynamically created by extracting the root value from the hierarchy table and attaching this root value to the hierarchy table, thus presenting a denormalized data set 650. Such hierarchy tables may be stored in the database and retrieved for queries for rights in the future.

As stated previously, property owners or licensors generally have at least two basic sets of information to track: 1) the rights they have acquired (Rights In), and 2) the rights they have sold or licensed to another entity (Rights Out). The difference between these two sets of data identifies what rights are available for further exploitation, also referred to as 'Available Rights', or 'Availabilities.'

One method for achieving bi-directional hierarchical navigation of rights-related data elements, i.e., the ability to identify generational relationships, such as ancestor/descendent relationships, between any two values at any level in a hierarchy, utilizes binary tree data structures.

Figure 14:
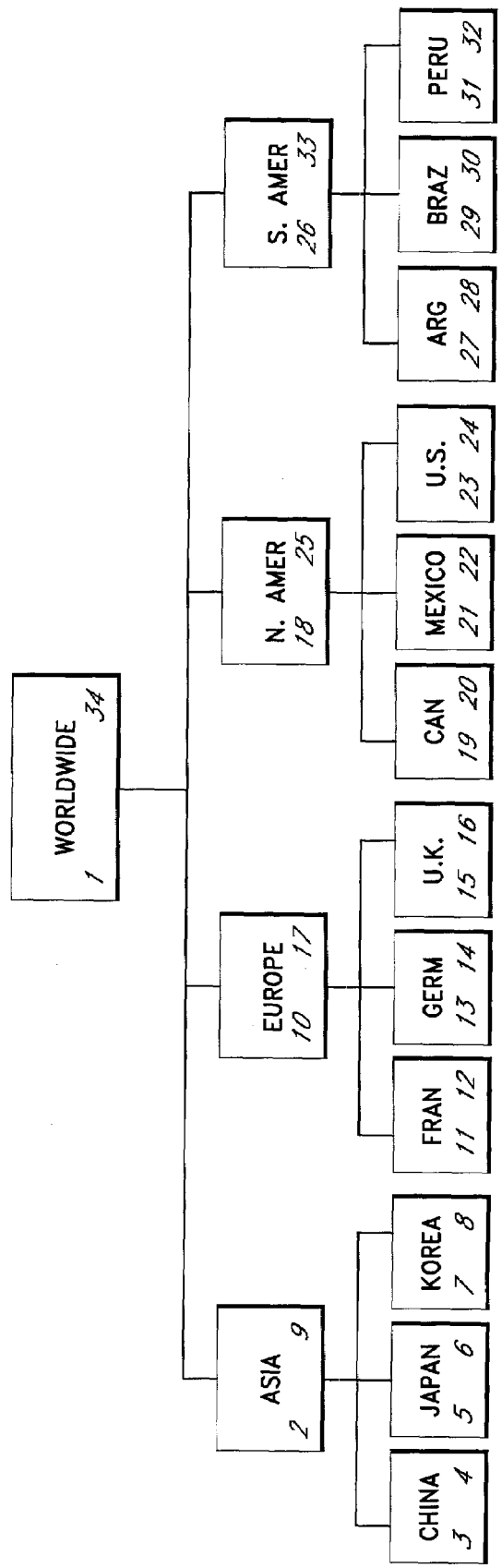
FIG. 14 illustrates another example tree.

A binary tree can be defined as a collection of 'nodes.' FIG. 14 is an example of a tree structure. Asia, Germany, and South America are examples of nodes. A tree has a primary node, or 'root.' The root node in FIG. 14 is "Worldwide." A node that has no children is known as a 'leaf.' The node "Korea," is an example of a leaf node. A node is said to be a 'parent' if another node is a direct 'descendent.' Referring to FIG. 14, "North America" is a parent node to "Mexico," and "Mexico" is a child node to "North America." Nodes that have the same parent are said to be 'siblings.' "Mexico" and "U.S." are examples of sibling nodes in FIG. 14.

Some of the following example rules may also apply:

A root node has no parent.

A tree may have multiple root nodes.

A node can have no more than one parent.

A node may have many children.

Different branches of the tree may have different depths.

Applying a tree data structure to intellectual property rights provides for efficient information retrieval. To retrieve information stored in this data structure, the system performs calculations to assign a pair of "left & right" or "minimum & maximum" integers or other ordered identifiers to each node.

When a hierarchy is updated or edited, the system reassigns node integers, top-to-bottom, left-to-right. When the process is performed on the sample tree illustrated in FIG. 14, the node integers are as indicated in the respective node blocks. Table 1 illustrates FIG. 14 represented as a territory hierarchy table listing territory values and the corresponding territory parent, minimum node integer value and maximum node integer value.

TABLE 1

Territory Hierarchy Table with Node Integers

| Territory Value | Territory Parent | Minimum Node Integer | Max Node Integer |
|---|---|---|---|
| Worldwide | | 1 | 34 |
| Asia | Worldwide | 2 | 9 |
| Europe | Worldwide | 10 | 17 |
| North America | Worldwide | 18 | 25 |
| South America | Worldwide | 26 | 33 |
| China | Asia | 3 | 4 |
| Japan | Asia | 5 | 6 |
| Korea | Asia | 7 | 8 |
| France | Europe | 11 | 12 |
| Germany | Europe | 13 | 14 |
| United Kingdom | Europe | 15 | 16 |
| Canada | North America | 19 | 20 |
| Mexico | North America | 21 | 22 |
| United States | North America | 23 | 24 |
| Argentina | South America | 27 | 28 |
| Brazil | South America | 29 | 30 |
| Peru | South America | 31 | 32 |

When the above data set exists as a table or view in a relational database, standard SQL queries can be used to efficiently retrieve ancestor and descendent values in a rights-related hierarchy defined by a system user.

If a user submits a request which necessitates the rights licensing application to retrieve all the descendents of Asia, which has a minimum node value of 2 and a maximum node value of 9, the SQL statement can take the following example form:

Select Territory Value From Table 1 Where Minimum Node Integer>=2 and Minimum Node Integer<=9

The result set from this query is as shown in Table 2:

| | Territory Value |
|---|---|
| | Asia |
| | China |
| | Japan |
| | Korea |

The technique described above can be applied to any rights-related data element in different rights-related hierarchies of varying depths. The technique enables the system to dramatically reduce the amount of data required to store for managing rights information.

By way of example, a rights owner or licensor has acquired rights (Rights In) for "All Media" types, in "All Countries," in "All Languages," the system allows the user to select the highest, or most general level of rights owned. Rather than storing all possible combinations of available and/or unavailable rights, the system stores the highest node or level of available rights in the tree and the highest node or level of exclusions, if any.

Since the data elements (Rights Types, Countries, and Languages) have a hierarchical relationship, then the list of values for each of these data elements can be presented in a hierarchical fashion to the user as illustrated below.

For example, if a user, such as a rights owner, owns or can license out all media rights to a given property, rather than having to specify and create records for each media right owned, when presented with a hierarchical list of Right Types, the user can select 'All Media' from the list of values illustrated in example Table 3 below:

TABLE 3

| | Right Types |
|---|---|
| All Media | |
| Merchandise | Accessories |
| | Apparel |
| | Games |
| Music | Performance |
| | Publishing |
| | Recording |
| Television | Basic Cable |
| | Free TV |
| | Pay TV |
| Video | DVD |
| | Laser Disc |
| | VHS |

If the user owns or can license out the worldwide rights to the given property, rather than having to specify and create records for each country, when presented with a hierarchical list Territories, the user selects 'Worldwide' from the list of values in example Table 4:

Table 4

| | Territories | |
|---|---|---|
| Worldwide | | |
| | Asia | China |
| | | Japan |
| | | Korea |
| | Europe | France |
| | | Germany |
| | | United Kingdom |
| | North America | Canada |
| | | Mexico |
| | | United States |
| | South America | Argentina |
| | | Brazil |
| | | Peru |

If the user owns or can license out rights in all language, rather than having to specify and create records for each language, when presented with a hierarchical list of Languages, such as that in Table 5 below, the user selects 'All Languages' from the list of values:

Table 5

| Languages |
|---|
| All Languages |
| English |
| French |
| German |
| Japanese |
| Spanish |
| — |

In one embodiment, the present invention reduces or minimizes the amount of data entry required by a system user, and further reduces or minimizes the amount of data the system needs to store. In one example embodiment, a unique record, or right set, is joined with the appropriate hierarchies to calculate the valid combinations. Thus, the system simulates the existence of large amounts of data via implied data relationships when the system is queried.

Table 6 below, illustrates the unique record created and stored when the user selects "All Media," "Worldwide," and "All Languages" as discussed above.

Table 6

| Right Type | Territory | Language |
|---|---|---|
| All Media | Worldwide | All Languages |

If the set of rights information provided in Table 6 is associated with a film, such as Jaws, in response to a user request regarding a specific set of rights, the system would query the hierarchy for each data element (Right Type, Territory, and Language) and retrieve all the 'descendent' values of each value in the right set.

The following are example actions the system can perform to complete the query:
1. Retrieve Right Types, Territories, and Languages from Right Set
2. Retrieve the descendents for 'All Media' in the Right Type hierarchy
3. Retrieve the descendents for 'Worldwide' in the Territory hierarchy
4. Retrieve the descendents for 'All Language' in the Language Type hierarchy
5. Combine the results into one set of data.

The example above is an example of 'downward' navigation of the hierarchy, where the navigation starts from the upper-most 'ancestor' value and traverses down the hierarchy to retrieve all the descendent values.

Table 7 below is a portion of a Data Set of calculated combinations of rights-related data generated from the results of the descendent retrieval process using the sample data above, in response to a query for the following rights set: "All Media," "Worldwide," and "All Languages."

Table 7

| Right Type | Territory | Language |
|---|---|---|
| All Media | Worldwide | All Languages |
| Merchandise | Worldwide | All Languages |
| Accessories | Worldwide | All Languages |
| Apparel | Worldwide | All Languages |
| Games | Worldwide | All Languages |
| Music | Worldwide | All Languages |
| Performance | Worldwide | All Languages |
| Publishing | Worldwide | All Languages |
| Recording | Worldwide | All Languages |
| Television | Worldwide | All Languages |
| Basic Cable | Worldwide | All Languages |
| Free TV | Worldwide | All Languages |
| Pay TV | Worldwide | All Languages |
| Video | Worldwide | All Languages |
| DVD | Worldwide | All Languages |
| Laser Disc | Worldwide | All Languages |
| VHS | Worldwide | All Languages |
| All Media | Asia | All Languages |
| Merchandise | Asia | All Languages |
| Accessories | Asia | All Languages |
| Apparel | Asia | All Languages |
| Games | Asia | All Languages |
| Music | Asia | All Languages |
| Performance | Asia | All Languages |
| Publishing | Asia | All Languages |
| Recording | Asia | All Languages |
| Television | Asia | All Languages |
| Basic Cable | Asia | All Languages |
| Free TV | Asia | All Languages |
| Pay TV | Asia | All Languages |
| Video | Asia | All Languages |
| DVD | Asia | All Languages |
| Laser Disc | Asia | All Languages |
| VHS | Asia | All Languages |
| All Media | China | All Languages |
| Merchandise | China | All Languages |
| Accessories | China | All Languages |
| Apparel | China | All Languages |
| Games | China | All Languages |
| Music | China | All Languages |
| Performance | China | All Languages |
| Publishing | China | All Languages |
| Recording | China | All Languages |
| Television | China | All Languages |
| Basic Cable | China | All Languages |
| Free TV | China | All Languages |
| Pay TV | China | All Languages |
| Video | China | All Languages |
| DVD | China | All Languages |
| Laser Disc | China | All Languages |
| VHS | China | All Languages |
| — | — | — |

The complete Table 7 would result in the following number of records:
17 Right Types×17 Territories×6 Languages=1,734 unique records.

Thus in this embodiment, with one right set the system can manage what traditional rights management systems need 1,734 records to manage.

The previous example query resulted in navigation that started at the top of the hierarchy. The following example illustrates an embodiment of the present invention applied to A inquiry that starts in the middle of a hierarchy.

If the query is:
"Are Pay TV rights, in English, in North America owned for Jaws?"

Again, assuming the same set of rights (All Media, Worldwide, All Languages) described above has been entered for Jaws, the system performs the following actions:
1. Retrieve Right Types, Territories, and Languages from Right Set
2. Retrieve the descendents for 'All Media' in the Right Type hierarchy
3. Retrieve the descendents for 'Worldwide' in the Territory hierarchy
4. Retrieve the descendents for 'All Languages' in the Language Type hierarchy 5. Combine results into one set of data.
6. Query the combined set of data to determine if a record exists for 'Pay TV, 'North America', and 'English.' In this example, the answer is yes.

The system is able to traverse the hierarchy to determine if a value (Pay TV) is owned. In this example, a specific record for Pay TV does not exist, nor is there a record for Pay TV's parent (Television). However, there is a record for Television's parent ('All Media). By traversing the hierarchy, the system determines the correct answer to the inquiry.

In the above examples the set of rights data is 'Rights In' data. That is, rights acquired or owned inherently through the creation of an original work of art, or by otherwise acquiring rights.

Figure 15:
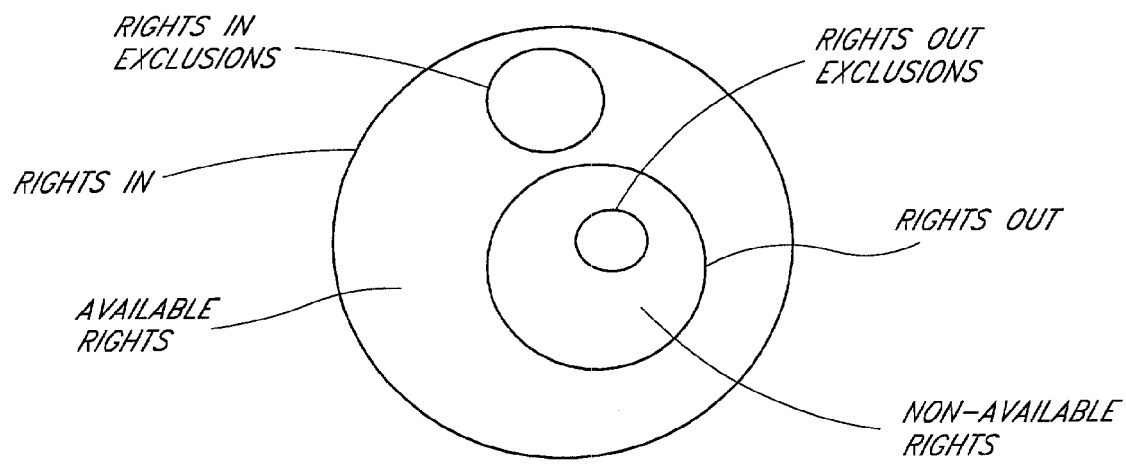
FIG. 15 illustrates an example of Rights In/Rights Out/Available Data Sets.

Some subset of the rights may have been held back, or excluded, from the total set of rights that were acquired. By way of example, the exclusion may be for a specific media-type, territory, language, or the like. The system can capture 'Rights In Exclusions' using the process previously described. For example, Universal Pictures may acquire All Media rights to Jaws, Worldwide, in all Languages, excluding Music rights in Asia, in English. As illustrated in Table 8 below, by adding an indicator that identifies the type of record (Right Set ID), such as Rights In, Rights In Excluded, Rights Out, and Rights Out Excluded, and an identifier that enables the system to group related records together (Right Record Type), the system can efficiently manage Rights In and Rights In Exclusion information. FIG. 15 illustrates an example of Rights In/Rights Out/Available Data Sets. Table 8 illustrates the totality of available rights and excluded rights can be defined using two records. If there were more exclusions, additional records may be used to define the additional exclusions.

Table 8

| Right Set ID | Right Type | Territory | Language | Right Record Type |
| --- | --- | --- | --- | --- |
| 1 | All Media | Worldwide | All Languages | Rights In |
| 1 | Video | Asia | English | Rights In Exclusion |

Given the following query:
"Are DVD rights, in China, in English, owned for Jaws?"
The system performs the following acts:
1. Retrieve Right Types, Territories, and Languages from Right Set
2. Retrieve 'Rights In' data
   a. Retrieve the descendents for 'All Media' in the Right Type hierarchy
   b. Retrieve the descendents for 'Worldwide' in the Territory hierarchy
   c. Retrieve the descendents for 'All Media' in the Right Type hierarchy
   d. Combine results into one set of data.
3. Retrieve 'Rights In Exclusion' data
   a. Retrieve the descendents for 'Video' in the Right Type hierarchy
   b. Retrieve the descendents for 'Asia' in the Territory hierarchy
   c. Retrieve the descendents for 'English' in the Right Type hierarchy
   d. Combine results into one set of data.
4. Join the two sets of data, removing the 'Rights In Exclusions' data from the 'Rights In' data.
5. Query the resulting set of data to determine if a record exists for 'DVD', 'China', and 'English.' In this example, the answer would be the requested right set is unavailable.

Thus, using only two records the system is able to infer the totality of rights availability.

'Rights In' and 'Rights In Exclusions' information provide a portion of the information used to manage rights. 'Rights Out' and 'Rights Out Exclusions' information provide additional data used to more completely mange the property rights. That is, of the set of rights acquired/licensed, what rights have been exclusively licensed out or sold. Again, building upon the previous example, adding an additional Right Record Type, as illustrated in Table 9 below, allows the system to distinguish between Rights In and Rights Out records:

Table 9

| Right Set ID | Right Type | Territory | Language | Right Record Type |
| --- | --- | --- | --- | --- |
| 1 | All Media | Worldwide | All Languages | Rights In |
| 1 | Video | Asia | English | Rights In Exclusion |
| 2 | Free TV | Canada | French | Rights Out |

Given the following question:
"Are Free TV rights, in Canada, in French, owned for Jaws?"
The system performs the following acts:
1. Retrieve 'Rights In' data
   a. Retrieve the descendents for 'All Media' in the Right Type hierarchy
   b. Retrieve the descendents for 'Worldwide' in the Territory hierarchy
   c. Retrieve the descendents for 'All Languages' in the Language hierarchy
   d. Combine results into one set of data.
2. Retrieve 'Rights In Exclusion' data
   a. Retrieve the descendents for 'Video' in the Right Type hierarchy
   b. Retrieve the descendents for 'Asia' in the Territory hierarchy
   c. Retrieve the descendents for 'English' in the Language hierarchy
   d. Combine results into one set of data.
3. Join the two sets of data, removing the 'Rights In Exclusions' data from the 'Rights In' data.
4. Retrieve 'Rights Out' data
   a. Retrieve the descendents for 'Free TV' in the Right Type hierarchy
   b. Retrieve the descendents for 'Canada' in the Territory hierarchy
   c. Retrieve the descendents for 'French' in the Language Type hierarchy
   d. Combine results into one set of data.
5. Join the two sets of data, removing the 'Rights Out' data from the 'Rights In' data.
6. Query the resulting set of data to determine if a record exists for 'Free TV', 'Canada', and 'French'. The resulting answer would be no.

Thus, in one embodiment, the present invention provides a method for associating intellectual property to a set of rights which is comprised of any number of rights-related characteristics, for associating values found in the 'rights set' to the appropriate descendent/ancestor values in a hierarchy, and for dynamically calculating a list of available rights through implied relationships resulting from bi-directional hierarchical navigation to thereby provide efficient storage of rights-related information.

Figure 8A:
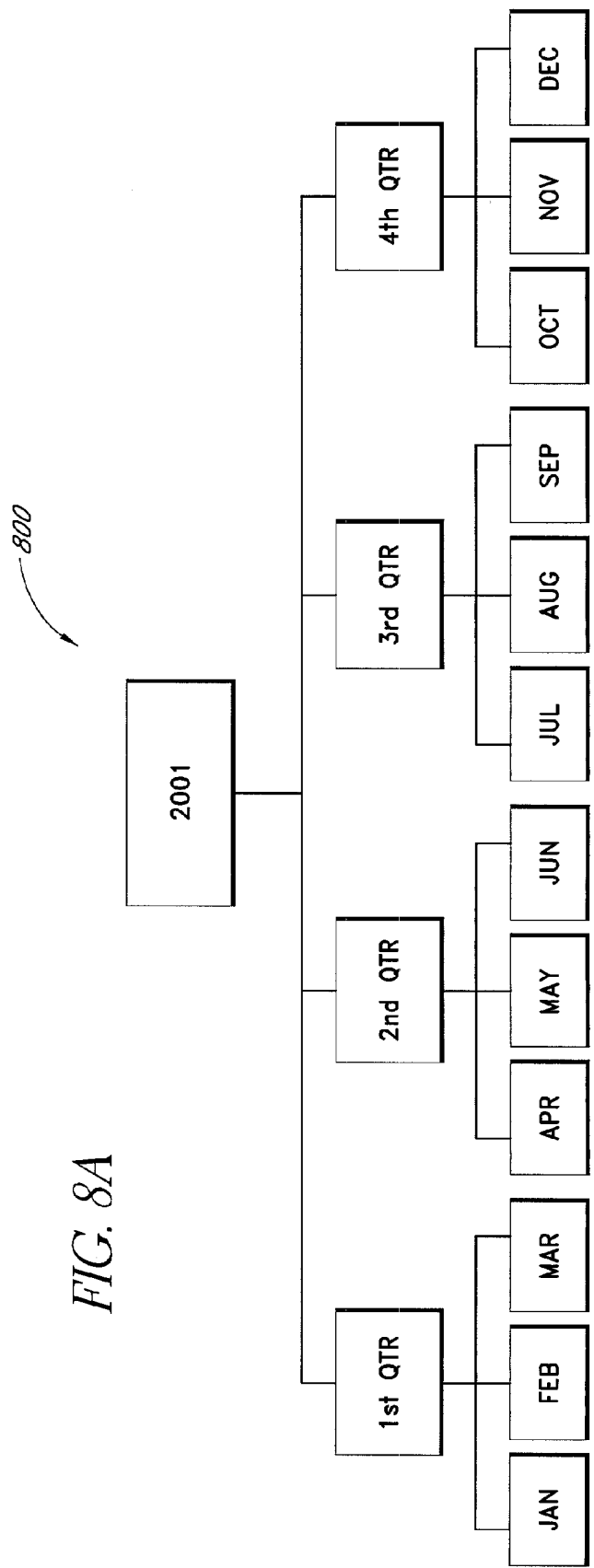
FIGS. 8A, 8B and 8C illustrate an example of how data is organized.

An example hierarchy tree 800 illustrating the hierarchical nature of licensing durations or terms is shown in FIG. 8A. In this example, there are three levels in the hierarchy for time: year, quarter, month. Such a hierarchy tree displays the parent-child relationships between each value of time. For example, the year '2001' is the parent of the quarter '1$^{st}$ quarter', which in turn is the parent of the month "January". A value that does not have a parent value is referred to as the root value, while a value that has no children and is at the bottom of the hierarchy is said to be a leaf value.

Figure 8B:
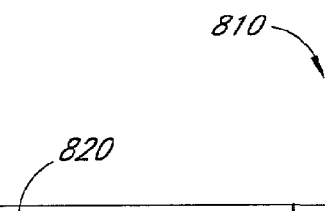

A relational database management system stores and retrieves relationships between data values by creating hierarchy tables 810. A sample hierarchy table 810 corresponding to the hierarchy tree 800 is shown in FIG. 8B. The first column 820 of the hierarchy table 810 consists of all the time leaf values, and the second column 830 consists of the corresponding parent values. Such a table is then used to determine parent-child relationship for any time value. For example, a Structured Query Language (SQL) query can be created in which the starting point is a leaf value and the resulting value is the root value. For example, a SQL query of "select time_parent where time_value='January'" would return the value '1$^{st}$ Qtr', and a subsequent query of "select time_parent where time_value='1$^{st}$ Qtr'" would return the value '2001'. Thus, in two queries the leaf value and the root value are traversed. In a similar fashion, queries can be written for hierarchy tables with large number of levels.

Figure 8C:
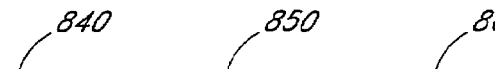

To avoid running multiple queries, a more circular view of the data is then dynamically created. The root value, which is the value highest in the hierarchy, is extracted from the data in the hierarchy table and attached to the hierarchy table as a separate column, thus presenting a denormalized data set. A sample circular view of the data is illustrated in FIG. 8C. In the illustrated table, the first column 840 represents the root value '2001'. This root value has been extracted from the hierarchy table in FIG. 8B and is the highest value in the time hierarchy tree 800 illustrated in FIG. 9A. The second column 850 represents the intermediate children values, namely the four quarters, and the third column 860 represents the final leaf values, namely the twelve months, which have no further children in the hierarchy tree 800.

In one embodiment of the relational database management system, an intellectual property right can be uniquely identified by a set of the following data elements: Property, Rights Type, Territory, Language and Term. FIGS. 9–13 illustrate hierarchy trees, hierarchy tables, and circular view tables for these data elements.

Figure 9A:
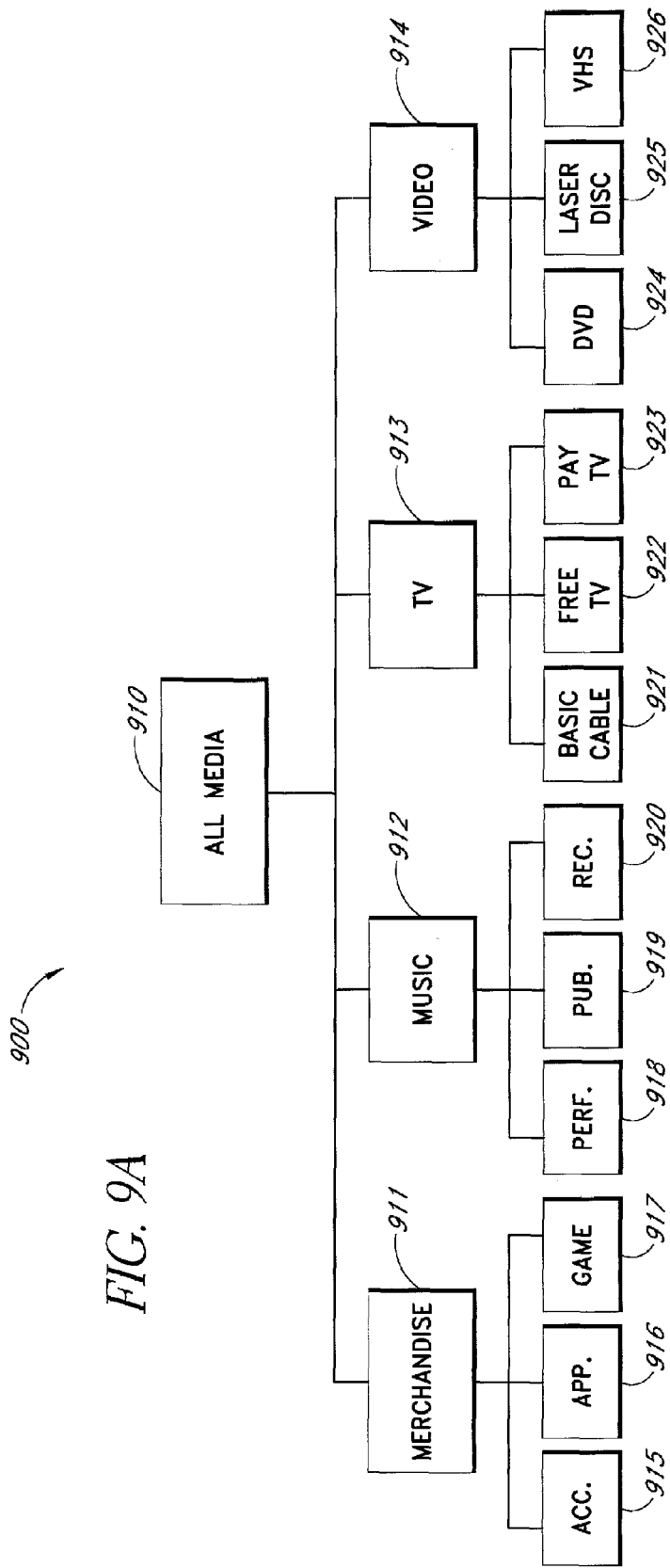

FIG. 9A illustrates the hierarchy tree 900 for media right types. The overall parent value is "all media" 910 with children values of 'merchandise' 911, 'music' 912, 'TV' 913, and 'video' 914. These children values have further children values, which form the leaf values for the hierarchy tree 900. For Example, 'merchandise' 911 has the children values of 'accessories' 915, 'apparel' 916 and 'games' 917. 'Music' 912 has the children values of 'performance' 918, 'publication' 919, and 'record' 920. 'TV' 913 has the children values of 'basic cable' 921, 'free TV' 922, and 'pay TV' 923. 'Video' 914 has the children values of 'DVD' 924, 'Laser Disc' 925, and 'VHS' 926.

FIG. 9B illustrates the hierarchy table for rights types. The first column 930 of the hierarchy table consists of all the media right type leaf values, and the second column 940 consists of the corresponding parent values. FIG. 9C illustrates the circular hierarchy table for right types. In the illustrated table, the first column 950 represents the root value 'all media'. This root value has been extracted from the hierarchy table in FIG. 9B and is the highest value in the media rights type hierarchy tree illustrated in FIG. 9A. The second column 960 represents the intermediate children values, namely 'merchandise' 911, 'music' 912, 'TV' 913, and 'video' 914. The third column 970 represents the final leaf values, such as 'accessories' 915, 'apparel' 916, 'games' 917, and so on, which have no further children in the hierarchy tree 900 illustrated in FIG. 9A. In one embodiment, such hierarchy tables may be created using SQL commands similar to those used in creating the hierarchy table in FIGS. 8B and 8C.

Figure 10A:
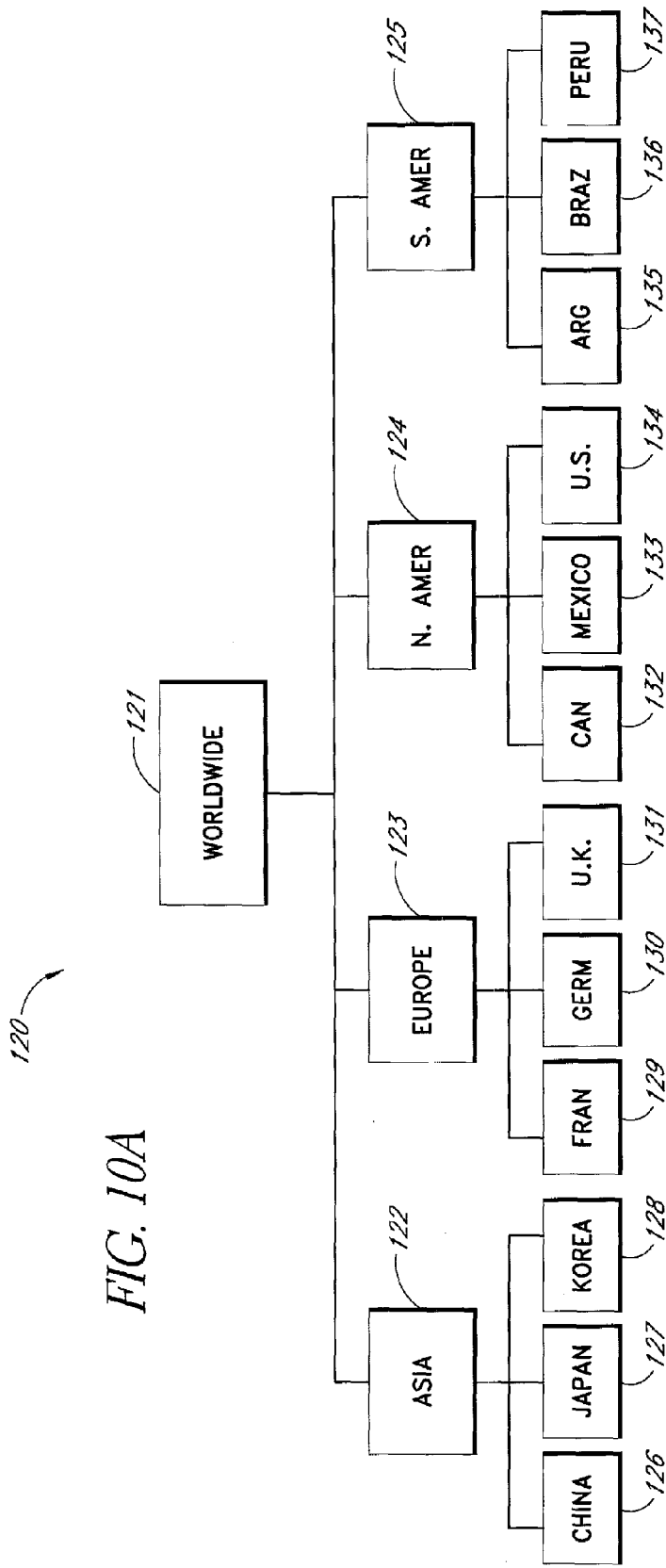

In a similar fashion FIG. 10A illustrates the hierarchy tree 120 for territories. The overall parent value is "worldwide" 121 with children values of 'Asia' 122, 'Europe' 123, 'North America' 124, and 'South America' 125. These children values have further children values, which form the leaf values for the hierarchy tree 120. For Example, 'Asia' 122 has the children values of 'China' 126, 'Japan' 127 and 'Korea' 128. 'Europe' 123 has the children values of 'France' 129, 'Germany' 130, and 'United Kingdom' 131. 'North America' 124 has the children values of 'Canada' 132, 'Mexico' 133, and 'United States' 134. 'South America' 125 has the children values of 'Argentina' 135, 'Brazil' 136, and 'Peru' 137.

FIG. 10B illustrates the hierarchy table for territories. The first column 140 of the hierarchy table consists of all the territory leaf values, and the second column 150 consists of the corresponding parent values. FIG. 10C illustrates the circular hierarchy table for territories. In the illustrated table, the first column 160 represents the root value 'worldwide'. This root value has been extracted from the hierarchy table in FIG. 10B and is the highest value in the media rights type hierarchy tree 120 illustrated in FIG. 10A. The second column 170 represents the intermediate children values, namely 'Asia' 122, 'Europe' 123, 'North America' 124, and 'South America' 125. The third column 180 represents the final leaf values, such as 'China' 126, 'Japan' 127, 'Korea' 128, and so on, which have no further children in the hierarchy tree 120 illustrated in FIG. 10A. In one embodiment, such hierarchy tables may be created using SQL commands similar to those used in creating the hierarchy table in FIGS. 8B and 8C.

Figure 11A:
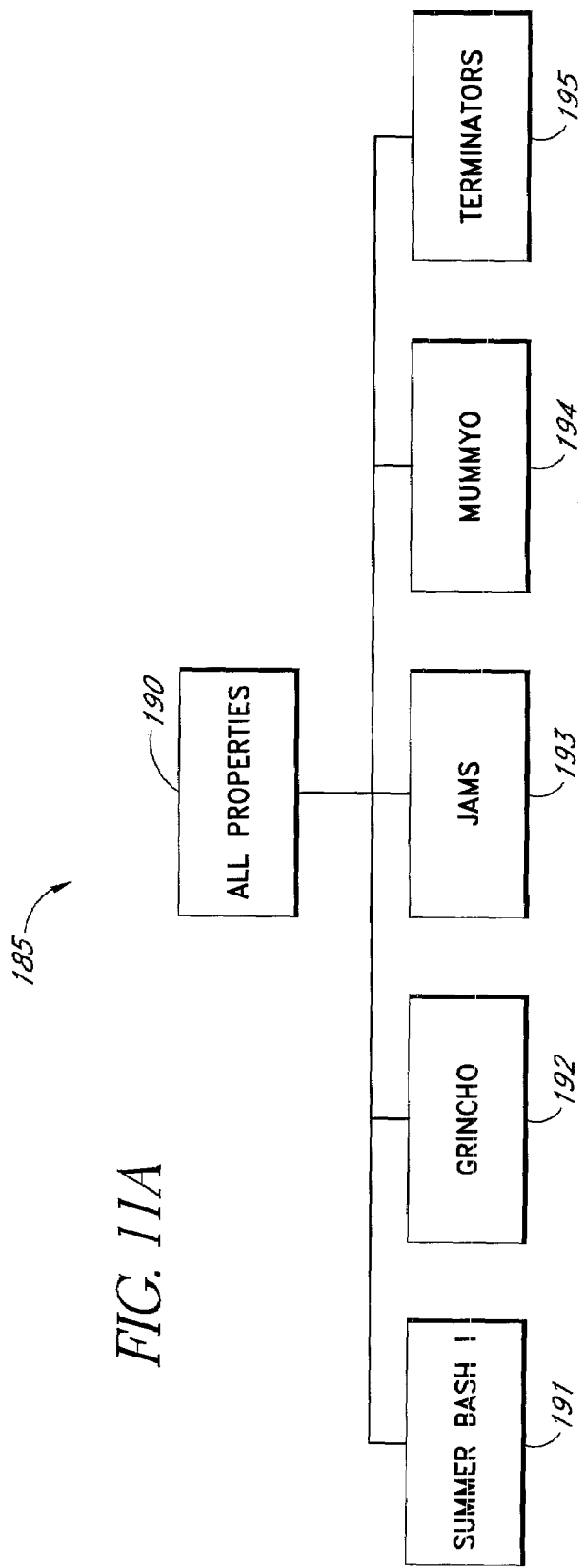

In a similar fashion FIG. 1A illustrates the hierarchy tree 185 for property types. The overall parent value is "all properties" 190 with children values of 'Summer Bash I' 191, 'Grincho' 192, 'Jams' 193, 'Mummyo' 194, and 'Terminators' 195. FIG. 11B illustrates the hierarchy table for property types. The first column 196 of the hierarchy table consists of all the property leaf values, and the second column 150 consists of the corresponding parent values. FIG. 11C illustrates the circular hierarchy table for property types. In the illustrated table, the first column 198 represents the root value "all properties" 190. This root value has been extracted from the hierarchy table in FIG. 11B and is the highest value in the media rights type hierarchy tree 185 illustrated in FIG. 11A. The second column 199 represents the final leaf values, such as 'Summer Bash I' 191, 'Grincho' 192, 'Jams' 193, and so on, which have no further children in the hierarchy tree 185 illustrated in FIG. 11A. In one embodiment, such hierarchy tables may be created using SQL commands similar to those used in creating the hierarchy table in FIGS. 8B and 8C.

Figure 12A:
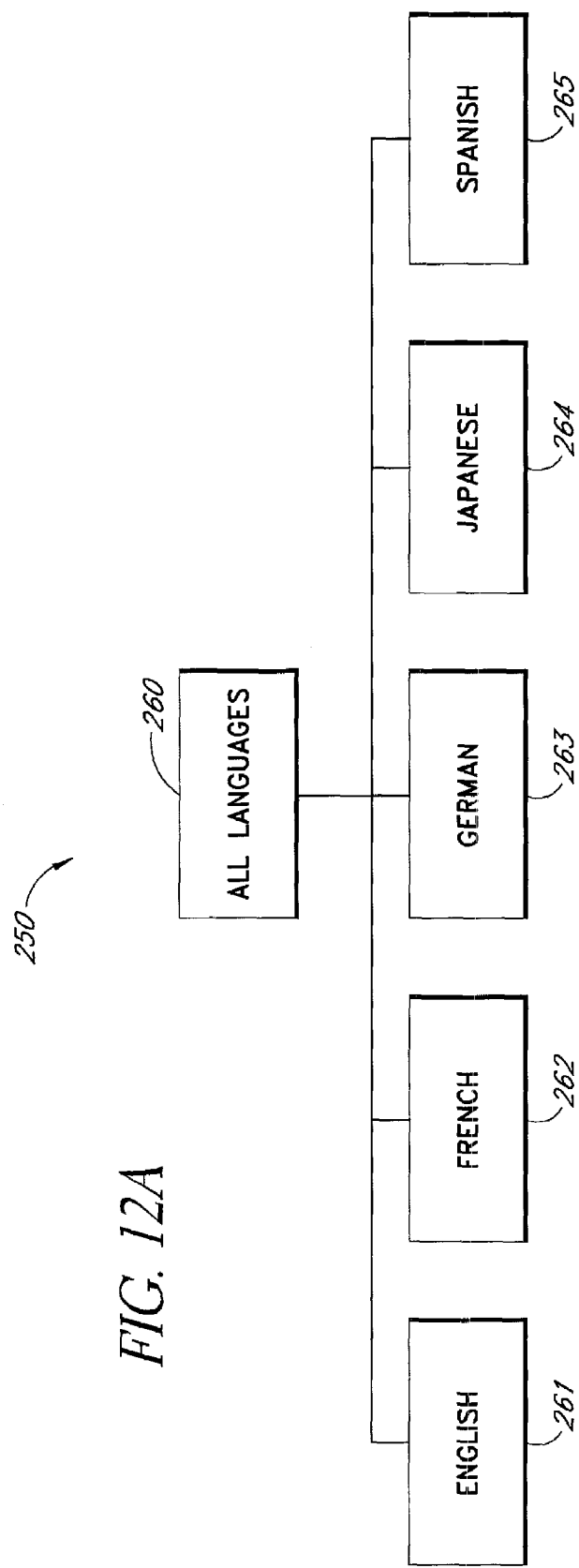

FIG. 12A illustrates the hierarchy tree 250 for languages. The overall parent value is "all languages" 260 with children values of 'English' 261, 'French' 262, 'German' 263, 'Japanese' 264, and 'Spanish' 265. FIG. 12B illustrates the hierarchy table for languages. The first column 270 of the hierarchy table consists of all the language leaf values, and the second column 275 consists of the corresponding parent values. FIG. 12C illustrates the circular hierarchy table for languages. In the illustrated table, the first column 280 represents the root value "all languages" 280. This root value has been extracted from the hierarchy table in FIG. 12B and is the highest value in the media rights type hierarchy tree 250 illustrated in FIG. 12A. The second column 285 represents the final leaf values, such as 'English' 261, 'French' 262, 'German' 263, and so on, which have no further children in the hierarchy tree 250 illustrated in FIG. 12A. In one embodiment, such hierarchy tables may be created using SQL commands similar to those used in creating the hierarchy table in FIGS. 8B and 8C.

Figure 13A:
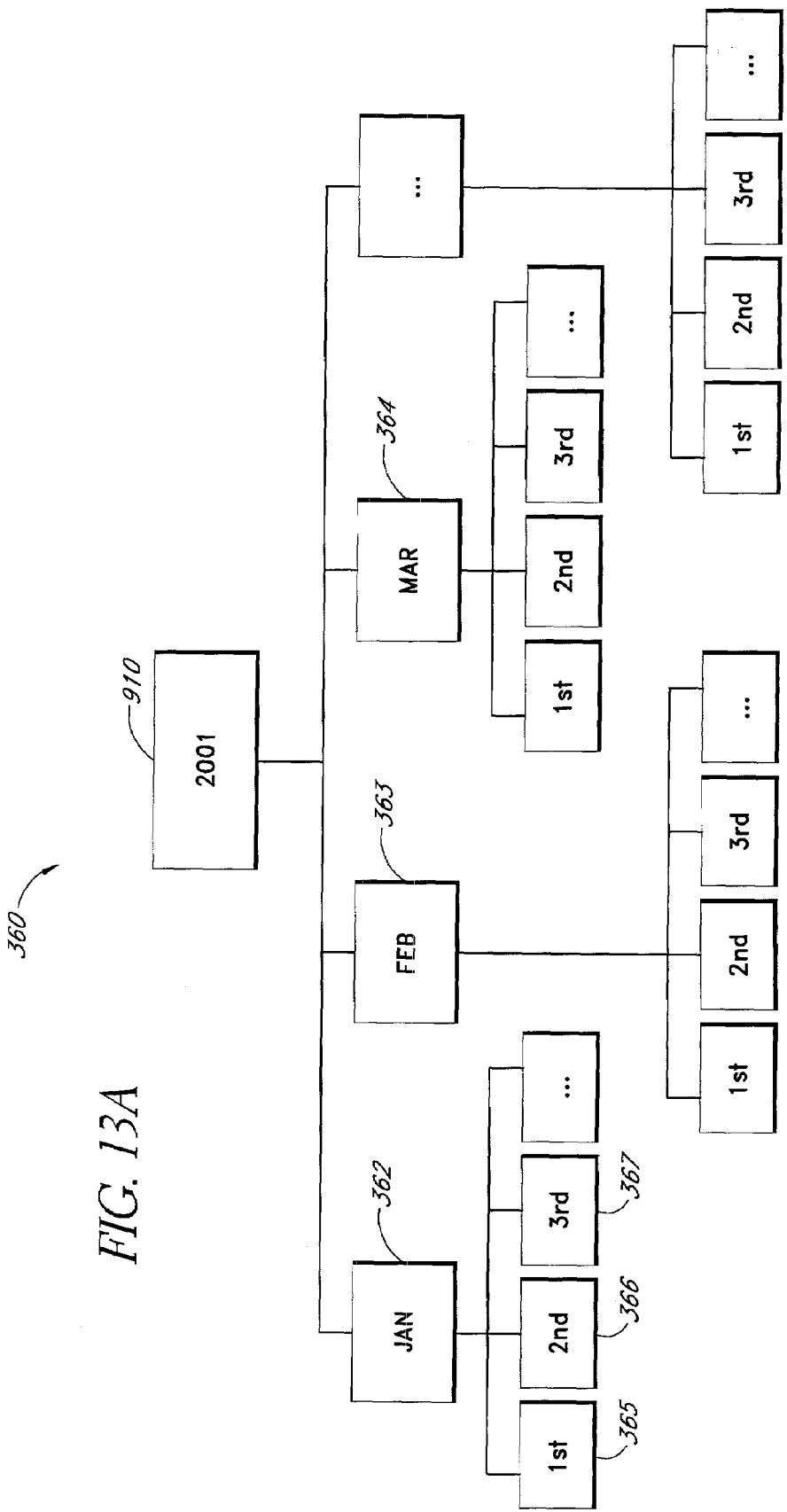

FIG. 13A illustrates the hierarchy tree 360 for terms. The overall parent value is "2001" 361 with children values of 'January' 362, 'February' 363, 'March' 364, and so on. These children values have further children values, which form the leaf values for the hierarchy tree 360. For Example, 'January' 362 has the children values of all the days of the month '1$^{st}$' 365, '2$^{nd}$' 366, '3$^{rd}$' 367, and so on. FIG. 13B illustrates the hierarchy table for terms. The first column 375 of the hierarchy table consists of all the term leaf values, and the second column 380 consists of the corresponding parent values.

FIG. 13C illustrates the circular hierarchy table for terms. In the illustrated table, the first column 385 represents the root value of the term year '2001'. This root value has been extracted from the hierarchy table in FIG. 13B and is the highest value in the media rights type hierarchy tree 360 illustrated in FIG. 13A. The second column 390 represents the intermediate children values, which are the months of the year. The third column 395 represents the final leaf values, namely the days of the month '1$^{st}$' 365, '2$^{nd}$' 366, '3$^{rd}$' 367, and so on, which have no further children in the hierarchy tree 360 illustrated in FIG. 13A. In one embodiment, such hierarchy tables may be created using SQL commands similar to those used in creating the hierarchy table in FIGS. 8B and 8C.

A hierarchical understanding of data elements, as is illustrated in FIGS. 9 through 13, can be inferred from the relational database management system. Therefore, there is no need to specifically define the hierarchical understanding, which is often necessary with conventional databases. In one embodiment, only the highest level or levels of information are stored for each one of the hierarchical data element sets. The hierarchies are used to infer what lower level rights are owned, licensed out and available.

In one embodiment, once a denormalized data set has been attained by attaching the root value to the hierarchy table, as illustrated in FIG. 8C, a search for a specific right can be accomplished using any number of commonly available methods. A relational database query written in Structured Query Language (SQL), in one embodiment, can be utilized to run against the hierarchy tables already generated to determine whether the right that is being searched is available.

For example, if the French language version of a movie is licensed in the territory of Canada for a term ending on the 1$^{st}$ of Jan. 2010, it can be determined using circular hierarchy tables, illustrated in FIGS. 10–13, that other rights on the movie may be available. Suppose, the user wishes to determine whether the DVD format of the movie is available for licensing in Korea for a term starting 1$^{st}$ of Jan. 2001. Using the hierarchy table illustrated in FIG. 10C, it may be determined that the movie can be licensed in many countries such as such as China, Japan, Korea, France, and so on. A relational database query written in Structured Query Language (SQL) that utilizes the information that the movie has already been licensed in France, in one embodiment, can run against the hierarchy table generated in FIG. 10C to determine that all rights to the property are available for licensing in Korea.

Now suppose the user wishes to determine whether the DVD format of the French version of the movie is available to be licensed in Canada for a term starting 1$^{st}$ of Jan. 2005 and ending on the 1$^{st}$ of Jan. 2020, where the French language version has already been licensed for a term ending on the 1$^{st}$ of Jan. 2010. A relational database query written in Structured Query Language (SQL) that utilizes the information that the movie French language version has already been licensed in Canada for a term ending on the 1$^{st}$ of Jan. 2010, in one embodiment, can run against the hierarchy table generated in FIG. 13C to determine that the French language version of the property is not available for licensing in Canada for the specified term.

Thus, using the date capabilities of a RDMBS, this hierarchical understanding of dates is inherent which means we do not have to specifically define this table structure, however, this logical relationship helps us for both the Term Start Date and the Term End Date. This system is far more efficient than conventional property rights systems that store a specific combination of data elements identifying every right as a unique element, wherein a data element is the most elementary unit of data that can be identified and described, but not subdivided. This makes determining availability of a right straightforward, however amount of data that must be stored is very large and can become unmanageable or unusable.

Thus, the present invention provides rights owners and licensors the ability to efficiently produce revenue for intellectual property related to movies, television shows, music, books, computer games, trademarks, personality, and so on. The present invention advantageously provides an integrated rights management and licensing system for storing, tracking, licensing, buying, and selling intellectual property rights. Advantageously, the rights owner can configure the licensing process by specifying the workflow, notification rules, document templates, and the like. In one embodiment, the present invention utilizes a rights owner application, a central repository database, a rights licensing application, and a rights exchange application, to integrate the management, tracking, and licensing of intellectual property. Accordingly, the present invention allows intellectual property owners and consumers or licensees to conduct real-time licensing transactions over a network, such as the Internet, an intranet, and the like.

What is claimed is:

1. A method of locating rights associated with a media property, the method comprising:
   defining a first rights characteristic;
   defining and storing in computer readable memory a first media rights hierarchy data structure having a first set of nodes with corresponding rights characteristics values for the first rights characteristic;
   identifying media rights ancestors and media rights decedents within the first set of nodes;
   assigning node identifiers to the first set nodes of the first media rights hierarchy data structure;
   identifying a first set of rights for a first media property, the first set of rights corresponding to at least a portion of the first set nodes; and retrieving from computer readable memory rights related information using a joining of the first set of rights and the first media rights hierarchy data structure.

2. The method as defined in claim 1, wherein the first set of rights includes at least a first rights exclusion.

3. The method as defined in claim 1, wherein the first set of rights includes an indication for a first right in the first set of rights indicating that the first right is available for licensing.

4. The method as defined in claim 1, further comprising identifying a second set of rights for a second property, the second set of rights corresponding to at least a second portion of the first set nodes.

5. The method as defined in claim 1, wherein the first set of rights includes a language right, a territory right, and a media right.

6. The method as defined in claim 1, wherein the first rights characteristic is one of media rights, territory rights, language rights, and term rights.

7. The method as defined in claim 1, wherein the rights characteristics values include "Worldwide" and "Europe."

8. The method as defined in claim 1, further comprising assigning a label to the first media rights hierarchy data structure.

9. The method as defined in claim 1, wherein the first set of nodes includes a worldwide node at a first level, a first continent node and a second continent node at a second level, and a first country node and a second country node at a third level, wherein the first level is an ancestor to the second level, and the second level is an ancestor to the third level.

10. The method as defined in claim 1, wherein the first set of nodes includes an all languages node at a first level, and a first language node and a second language node at a second level, wherein the first level is an ancestor to the second level.

11. The method as defined in claim 1, wherein the first set of nodes includes an all media node at a first level, and a first media-type node and a second media-type node at a second level, wherein the first level is an ancestor to the second level.

12. The method as defined in claim 1, further comprising:
defining a second rights characteristic; and
defining a second media rights hierarchy data structure having a second set nodes with corresponding rights characteristics values for the second rights characteristic.

13. The method as defined in claim 12, wherein the first rights characteristic is territory and the second rights characteristic relates to a time period.

14. The method as defined in claim 12, wherein the first media rights hierarchy data structure and the second media rights hierarchy data structure are defined at least in part by a licensor of the first property.

15. The method as defined in claim 1, further comprising a second media rights hierarchy data structure having a second set of nodes ordered differently then the first set of nodes, wherein the second set of nodes have corresponding rights characteristics values that include at least a portion of the rights characteristics values corresponding to the first set of nodes.

16. A method of locating rights associated with a media property, the method comprising:
defining a first set of rights characteristics;
assigning rights characteristics values to the first set of rights characteristics;
associating a first portion of the first set of rights characteristics with a first media rights hierarchy data structure, stored in computer readable memory, having a first set of nodes;
associating a second portion of the first set of rights characteristics with a second media rights hierarchy data structure, stored in computer readable memory, having a second set of nodes;
identifying generational relationships for the first set of nodes of the first media rights hierarchy data structure;
identifying generational relationships for the second set of nodes of the second media rights hierarchy data structure;
defining a first set of rights, the first set of rights corresponding to at least a first portion of at least one of the first set of nodes and the second set of nodes;
associating the first set of rights with a first media property;
defining a second set of rights, the second set of rights corresponding to at least a second portion of at least one of the first set of nodes and the second set of nodes;
associating the second set of rights with a second media property;
determining available rights for the first media property in response to a first user request from a user by navigating the at least one of the first and second media rights hierarchy data structures defined in the first set of rights; and
determining available rights for the second media property in response to a second user request by navigating the at least one of the first and second media rights hierarchy data structures defined in the second set of rights.

17. The method as defined in claim 16, wherein the user is a rights licensor.

18. The method as defined in claim 16, wherein the user is a rights licensee.

19. The method as defined in claim 16, further comprising:
joining the first set of rights characteristics with the first media rights hierarchy data structure; and
joining the second set of rights characteristics with the second media rights hierarchy data structure.

20. The method as defined in claim 16, wherein the first user request includes a license request for a first media in a first territory, in a first language.

21. The method as defined in claim 16, wherein the second user request includes a license request for a first media in a first territory.

22. The method as defined in claim 16, wherein the first user request includes a license request for a first media in a first language.

23. The method as defined in claim 16, further comprising:
in response to the first user request, retrieving descendents for a first node in the first media rights hierarchy data structure to generate a first result;
in response to the first user request, retrieving the descendents for a second node in the second media rights hierarchy data structure to generate a second result;
combining the first result and the second result into a first data set; and
querying the first set of data to determine if a first requested right is available.

24. The method as defined in claim 16, further comprising associating a third set of rights with the first media property.

25. A method for managing rights associated with intellectual property having an associated hierarchy of intellectual property rights, the method comprising:
    receiving a specification of a general level of rights corresponding to intellectual property owned by a first intellectual property rights owner;
    receiving a query for a lower level right corresponding to the intellectual property that is a descendent of at least one of the general level of rights in a hierarchy of intellectual property rights; and
    determining, via a media rights hierarchy data structure stored in computer readable memory, if the lower level rights corresponding to the intellectual property is available for licensing by forming at least a first implicit relationship between the general level of rights owned corresponding to the intellectual property, and a general level of rights licensed out corresponding to the intellectual property.

26. The method as defined in claim 25, the method further comprising generating a hierarchical data structure including the general level of rights and the lower of level of rights.

27. The method as defined in claim 25, wherein the general level of rights relates to a relatively larger time period then the lower level of rights.

28. The method as defined in claim 25, wherein the general level of rights relates to a relatively larger geographical area then the lower level of rights.

29. The method as defined in claim 25, wherein the general level of rights relates to a relatively larger number of languages then the lower level of rights.

30. An apparatus for managing rights associated with a first media property, the apparatus comprising:
    a first instruction stored in computer readable memory, the first instruction configured to receive a specification of a general level of rights associated with intellectual property owned by a first intellectual property rights owner;
    a second instruction stored in computer readable memory, the second instruction configured to receive a query for a lower level right that is a descendent of at least one of the general level of rights in a data structure hierarchy of intellectual property rights; and
    a third instruction stored in computer readable memory, the third instruction configured to determine if the lower level rights in the data structure hierarchy of intellectual property rights is available for licensing by forming at least a first implicit relationship between the general level of rights owned, and a general level of rights licensed out.

* * * * *